United States Patent Office 3,257,384
Patented June 21, 1966

3,257,384
DERIVATIVES OF 25-AZACHOLESTEROL AND
22-OXA-25-AZACHOLESTEROL
Norman A. Nelson, Kalamazoo, Mich., assignor to The Upjohn Company, Kalamazoo, Mich., a corporation of Delaware
No Drawing. Filed Jan. 4, 1963, Ser. No. 249,315
22 Claims. (Cl. 260—239.5)

This invention relates to novel steroid derivatives and is more particularly concerned with novel derivatives of 25-azacholesterol and 22-oxa-25-azachlosterol and with processes for their preparation.

The novel compounds of the invention are selected from the class consisting of
(a) compounds having the formulae:

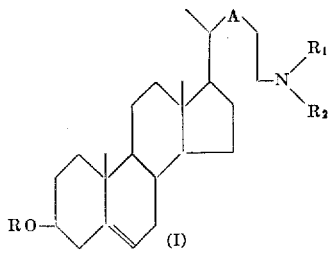

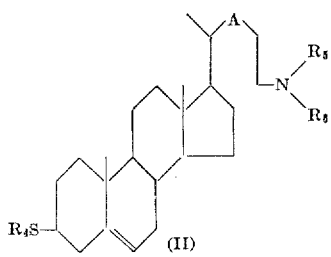

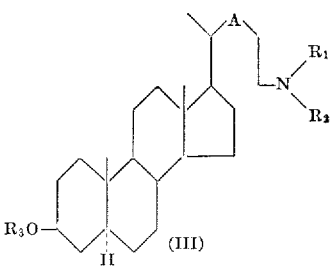

and

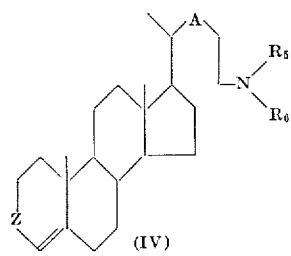

wherein $R_1$ and $R_2$ are selected from the group consisting of hydrogen, lower-alkyl, lower-alkenyl, and lower-hydroxyalkyl, and $R_1$ and $R_2$ taken together with the attached nitrogen atom also represent a 4 to 6 ring atom heterocyclic amino radical, R is selected from the class consisting of hydrogen, acyl wherein the acyl radical is that of a hydrocarbon carboxylic acid containing from 1 to 18 carbon atoms, inclusive, and the radical

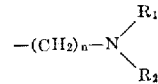

wherein $n$ is an integer from 2 to 6 and $R_1$ and $R_2$ have the significance above defined, provided that, when $R_1$ and $R_2$ represent hydrogen or lower-alkyl, R represents only

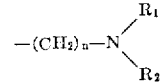

$R_3$ is selected from the class consisting of hydrogen, acyl wherein the acyl radical is that of a hydrocarbon carboxylic acid containing from 1 to 18 carbon atoms, inclusive, and the radical

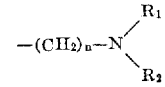

wherein $n$ and $R_1$ and $R_2$ are as defined above, $R_4$ is selected from the class consisting of hydrogen and the radical

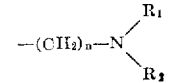

wherein $R_1$, $R_2$ and $n$ have the significance above defined, $R_5$ and $R_6$ taken individually are selected from the class consisting of lower-alkyl, and lower-alkenyl, and $R_5$ and $R_6$ taken together with the attached nitrogen atom also represent a 4 to 6 ring atom heterocyclic amino radical, Z is selected from the class consisting of carbonyl, hydroxymethylene, and >C=NOH, and A is selected from the class consisting of —O— and —CH$_2$—;

(b) the pharmacologically acceptable acid addition salts of the compounds of the above Formulae I, II, III and IV;
(c) the N-oxides of those compounds of the above Formulae I, III and IV in which the nitrogen atom or atoms is tertiary; and
(d) the pharmacologically acceptable acid addition salts of said N-oxides.

The term "lower-alkyl" means an alkyl radical containing from 1 to 8 carbon atoms, inclusive, such as methyl, ethyl, propyl, butyl, amyl, hexyl, heptyl, octyl and isomeric forms thereof. The term "lower-alkenyl" means an alkenyl radical containing from 2 to 8 carbon atoms, inclusive, such as vinyl, propenyl, butenyl, pentenyl, hexenyl, heptenyl, octenyl, and isomeric forms thereof. The term "lower-hydroxyalkyl" means an alkyl radical containing from 1 to 8 carbon atoms, inclusive, substituted by a hydroxy group on one carbon atom thereof, such as hydroxymethyl, 2-hydroxyethyl, 2-hydroxypropyl, 3-hydroxypropyl, 3-hydroxybutyl, 4-hydroxypentyl, 3-hydroxyhexyl, 5-hydroxypentyl, 8-hydroxyoctyl and the like. The term "4 to 6 ring atom heterocyclic amino radical" means a heterocyclic radical having from 4 to 6 atoms in the ring thereof, at least one of which ring atoms is nitrogen and in which a second ring atom can be nitrogen, oxygen, or sulfur, the remaining ring atoms being carbon. Illustrative of such radicals are pyrrolidino, 2,2-dimethylpyrrolidino, piperidino, 2-methylpiperidino, 3-methylpiperidino, piperazino, 4-methylpiperazino, morpholino, thiamorpholino, thiazolidino, oxazolidino, trimethyleneimino, and the like.

The term "hydrocarbon carboxylic acid containing from 1 to 18 carbon atoms, inclusive," means saturated and unsaturated aliphatic and aromatic hydrocarbon carboxylic acids having the stated number of carbon atoms. Illustrative of such acids are acetic, propionic, butyric, isobutyric, tert.-butylacetic, valeric, isovaleric, caproic, caprylic, decanoic, dodecanoic, myristic, palmitic, stearic, acrylic, crotonic, hexynoic, octynoic, oleic, cyclobutanecarboxylic, cyclopentanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, p-butoxyphenylpropionic, succinic, glutaric, dimethylglutaric, maleic, cyclopentylpropionic acids, and the like.

The pharmacologically acceptable acid addition salts of the invention are the salts of the free amino compounds I, II, III, and IV and of the N-oxides of those free amines in which the nitrogen atom is tertiary, with pharmacologically acceptable acids such as sulfuric, hydrochloric, nitric, phosphoric, lactic, benzoic, methanesulfonic, p-toluenesulfonic, salicylic, acetic, propionic, maleic, malic, tartaric, citric, cyclohexylsulfamic, succinic, nicotinic, ascorbic acids, and the like.

The novel compounds of the invention, i.e., the compounds of the Formulae I, II, III and IV and their pharmacologically acceptable acid addition salts and N-oxides of those compounds of the Formulae I, II, III and IV wherein the N atom is tertiary, together with the N-oxide pharmacologically acceptable acid addition salts, possess pharmacological activity. Thus, the compounds of the invention are active as agents for the lowering of cholesterol blood levels in mammals including man and animals of economic value. In addition, the compounds of the invention possess activity as coronary vasodilators and as central nervous system depressants. Illustratively, the compounds of the invention can be used as sedatives and general anesthetics in the laboratory manipulation of experimental animals.

The novel compounds of the invention can be prepared and administered to mammals, birds, humans, and animals, in a wide variety of oral or parenteral dosage forms, singly or in admixture with other coacting compounds. They can be administered with a pharmaceutical carrier which can be a solid material or liquid in which the compound is dissolved, dispersed, or suspended. The solid compositions can take the form of tablets, powders, capsules, pills or the like, preferably in unit doage forms for simple administration or precise dosages. The liquid compositions can take the form of solutions, emulsions, suspensions, syrups or elixirs.

In addition to their pharmacological usefulness, the compounds of the invention are also useful as intermediates in chemical synthesis. Illustratively, the compounds of the invention having the Formulae I, II, III and IV are useful, in accordance with U.S. Patents 1,915,334 and 2,075,359, in forming amine fluosilicate mothproofing agents.

The novel compounds of the invention can be prepared is follows:

The compounds having the Formula I wherein R is hydrogen or acyl, A is —$CH_2$— and $R_1$ and $R_2$ are as hereinbefore defined can be prepared following the method described by Louw et al. Rec. trav. chim. 73, 667 (1954) for the preparation af azacholesterol. Thus the known compounds, 3β-acyloxy-5-cholenic acid chloride, are reacted with the appropriate amine $R_1R_2NH$, wherein $R_1$ and $R_2$ are as hereinbefore defined, to form the corresponding N,N-disubstituted amide. The latter compound is then reduced with a reducing agent known in the art for the reduction of amides to amines, for example lithium aluminum hydride, in the presence of an inert solvent such as ether, tetrahydrofuran, N-methylmorpholine, 1,2-dimethoxyethane, and the like, to produce the desired compound I wherein R is hydrogen, A is methylene and $R_1$ and $R_2$ are as hereinbefore defined. The 3-acylates of the 3-hydroxy compound so obtained can be obtained by reacting the 3-hydroxy compound with the appropriate acid halide or acid anhydride in the presence of a tertiary amine such as pyridine.

The 3-hydroxy compounds of Formula I (R=H; A=$CH_2$ and $R_1$ and $R_2$ are hereinbefore defined) can also be prepared using an alternate route as follows:

An alkyl 3β-hydroxy-5-cholenate is tosylated by reaction with p-toluenesulfonyl chloride in the presence of a tertiary base to produce the corresponding alkyl 3β-tosyloxy-5-cholenate which is then subjected to the i-steroid rearrangement (see Fieser and Fieser, Steroids, pages 314 to 316, Reinhold Publishing Corp., New York, 1959) by heating in a solvent such as methanol, ethanol and the like with an alkali metal salt of a carboxylic acid, for example potassium acetate, sodium benzoate, and the like to yield the corresponding alkyl 6β-alkoxy-3,5-cyclocholanate. The latter compound is then subjected to reduction using reducing agents well known in the art for the reduction of esters to primary alcohols, for example, lithium aluminum hydride and the like, to give the corresponding alcohol, namely, 6β-alkoxy-3,5-cyclocholan-24-ol. The latter compound is reacted with an alkyl-sulfonyl halide such as methane sulfonyl chloride or an arylsulfonyl halide such as p-toluenesulfonyl chloride in the presence of a tertiary amine such as pyridine to yield the corresponding 6β-alkoxy-3,5-cyclocholan-24 - ol - alkyl or arylsulfonate and the latter is reacted with excess amine $R_1R_2NH$ wherein $R_1$ and $R_2$ have the significance above defined, if desired, in the presence of an inert organic solvent.

There is thus obtained the corresponding N-substituted 25-aza-6β-alkoxy-3,5-cyclocholane which is converted to the desired compound I (R=H, A=$CH_2$; $R_1$ and $R_2$ are as defined above) by (a) treating with excess formic acid, if desired, with heating, followed by treatment with a strong base such as sodium hydroxide, potassium hydroxide, and the like or (b) by treatment with excess aqueous mineral acid or (c) by treatment with zinc acetate in the presence of acetic acid, preferably at elevated temperature, followed by treatment with a strong base such as sodium hydroxide, potassium hydroxide and the like.

The 3-O-ethers of the Formula I

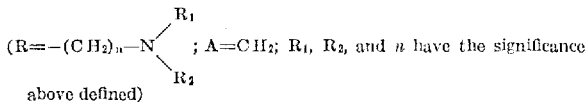

(R=—(CH$_2$)$_n$—N ; A=CH$_2$; R$_1$, R$_2$, and $n$ have the significance above defined)

can be prepared by a number of alternative routes.

In one alternative, a 6β-alkoxy-3,5-cyclocholan-24-ol (prepared as described above) is reacted with the appropriate diol HO(CH$_2$)$_n$OH, where $n$ has the significance defined above, in the presence of a small quantity of an acid such as p-toluenesulfonic acid and an inert solvent such as benzene, toluene and the like. There is thus produced a compound having the formula:

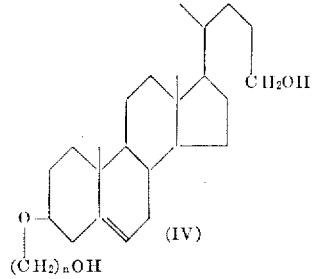

and the latter is reacted with an alkyl sulfonyl halide such as methanesulfonyl chloride or an arylsulfonyl halide such as p-toluenesulfonyl chloride in the presence of a tertiary amine such as pyridine to produce the corresponding bis(alkylsulfonate) or bis(arylsulfonate).

The bis(alkylsulfonate) or bis(arylsulfonate) so obtained is reacted with an excess of the appropriate amine $R_1R_2NH$ (wherein $R_1$ and $R_2$ have the significance defined above) in the presence of an inert organic solvent such as methanol, ethanol, isopropanol, tetrahydrofuran, ether, benzene, toluene, xylene, dimethylformamide and the like. The reaction can be effected at room temperature (approximately 25° C.) or at elevated temperature such as the boiling point of the solvent. There is thus obtained the corresponding compound having the Formula I wherein A is methylene, $R_1$ and $R_2$ are as hereinbefore defined and R is

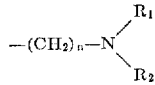

An alternative route to the latter compounds, which route is capable of yielding compounds in which the substituents on the nitrogen in the 3-ether group are different from those on the nitrogen atom at the 25-position, as well as compounds in which the substituents are the same on both nitrogen atoms, consists in reacting the appropriately N-substituted 25-aza-6β-alkoxy-3,5-cyclocholane (prepared as described above) with the appropriate diol $HO(CH_2)_nOH$, where $n$ has the significance defined above, in the presence of an acid such as p-toluenesulfonic acid and an inert solvent such as benzene, toluene and the like. There is thus produced a compound having the formula:

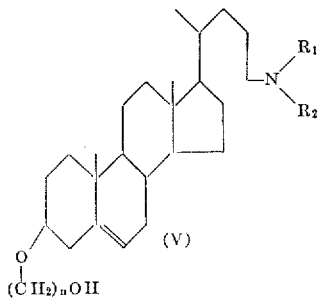

wherein $R_1$, $R_2$ and $n$ have the significance defined above, except that neither $R_1$ nor $R_2$ represents hydroxyalkyl in this particular instance. The latter compound is converted to the corresponding alkyl sulfonate or arylsulfonate using the reaction conditions previously described for the sulfonacylation of IV and the alkyl or aryl sulfonate so obtained is reacted with the appropriate amine $R_1R_2NH$ (wherein $R_1$ and $R_2$ have the significance hereinbefore defined) under the reaction conditions previously described, to give the desired compound I wherein A is methylene, $R_1$ and $R_2$ have the significance hereinbefore defined and R is

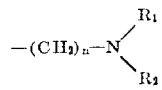

Where the compound (V) in the above synthesis has a free hydrogen atom attached to the nitrogen atom, i.e., one or both of $R_1$ and $R_2$ represents hydrogen, said compound is preferably converted to the desired compound I by an alternate procedure. In this alternate procedure the compound (V) is subjected to acylation by conventional procedures, for example, by treatment with an acid anhydride, preferably acetic anhydride, if desired, in the presence of a tertiary base such as pyridine to produce the corresponding N-acyl compound. Esterification of the hydroxy group in the side chain of the 3-substituent also occurs and the O-acyl radical can be hydrolyzed preferentially without removal of the N-acyl group by treatment under mild alkaline conditions, for example, by hydrolysis using aqueous methanolic potassium carbonate and the like. The N-acyl derivative so obtained is then subjected to sulfonacylation followed by reaction with the appropriate amine $R_1R_2NH$ under the conditions previously described to yield the corresponding N-acyl derivative of the desired compound I. The latter compound is then deacylated using vigorous hydrolysis conditions, for example, by heating with aqueous methanolic potassium hydroxide or aqueous or methanolic mineral acid such as hydrochloric acid, to give the desired compound I wherein A is methylene, $R_1$ and $R_2$ are as hereinbefore defined and R is

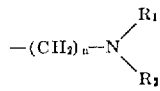

The thiols and thio-ethers of Formula II, i.e., the compounds of Formula II wherein A is methylene, $R_5$ and $R_6$ are as hereinbefore defined and $R_4$ is hydrogen or

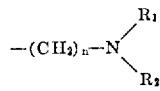

are prepared from the corresponding free 3-hydroxy compounds (I; R=H) by the following procedure. The corresponding free 3-hydroxy compound (I; R=H; $A=CH_2$) prepared as described above is converted to the corresponding alkylsulfonate or arylsulfonate by the methods described above for the sulfonacylation of IV. The 3-sulfonacylate so obtained is heated with an excess of thiourea in the presence of a tertiary base such as pyridine and an inert solvent such as methanol, ethanol, and the like and the product so obtained is subjected to alkaline hydrolysis, for example, by heating with alcoholic alkali such as potassium hydroxide, sodium hydroxide, and the like, followed by acidification to yield the corresponding 3-thiol (II; $A=CH_2$; $R_4=H$; $R_5$ and $R_6$ are as defined above).

Where one or both groups $R_1$ and $R_2$ in the 3-hydroxy starting material represent hydrogen, it is necessary to convert the starting material to its N-acyl derivatives using the procedure described above (i.e., acylation of the starting material followed by preferential hydrolysis of the O-acyl radical) before carrying out the above-described thiation procedure. The protecting acyl group on the N-atom will be removed during the final alkaline hydrolysis of the thiation procedure to give the corresponding 3-thiol (II) wherein one or both of the groups $R_5$ and $R_6$ represent hydrogen.

The 3-thiol so obtained is then alkylated by reaction with the appropriately substituted aminoalkyl halide $R_1R_2N—(CH_2)_n$-Hal wherein Hal represents halogen, preferably chlorine, and $R_1$, $R_2$ and $n$ are as hereinbefore defined, in the presence of an alkali metal alkoxide such as potassium t-butoxide in an organic solvent such as tetrahydrofuran, dimethylformamide, and the like to obtain the desired compound II wherein $R_4$ is

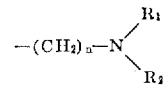

A is methylene, and $R_1$ and $R_2$ have the significance above defined.

The compounds having the Formula I in which A represents —O— and R, $R_1$, and $R_2$ are as defined above can be prepared in the following manner. Pregnenolone is converted to its 3-alkylsulfonate or 3-arylsulfonate, preferably its 3-p-toluenesulfonate, using the sulfonacylation procedures described above and the 3-sulfonacylate so obtained is subjected to the i-steroid rearrangement (see Fieser and Fieser, supra) by heating with an alkali metal salt of a hydrocarbon carboxylic acid, preferably sodium acetate, in the presence of a lower alkanol such as methanol, ethanol and the like, to obtain the corresponding 6β-alkoxy-3,5-cyclopregnan-20-one, the alkyl of the alkoxy group corresponding to the alkyl residue of the lower alkanol used in the reaction mixture.

The 6β-alkoxy-3,5-cyclopregnan-20-one so obtained is then reduced using reducing agents well known in the art for the conversion of a 20-keto group to the corresponding 20-hydroxy compound, for example, using lithium aluminum hydride, sodium borohydride, and the like, whereby there is produced a mixture of the 20α- and 20β-epimers of the corresponding 6β-alkoxy-3,5-cyclopregnane-20-ol. The latter mixture can be separated into its components by conventional procedures such as chromatography, countercurrent distribution, fractional crystallization and the like.

The individual epimers so obtained or the mixture of epimers obtained as described above are then subjected to alkylation by reaction with the appropriately substituted aminoalkyl halide $R_1R_2N$—$(CH_2)_2$-Hal wherein Hal represents a halogen atom, preferably chlorine or bromine, and $R_1$ and $R_2$ have the significance hereinbefore defined. The alkylation can be effected in the presence of a lithium alkyl such as n-butyllithium and an inert organic solvent preferably an aliphatic hydrocarbon such as hexane, heptane and the like or an aromatic hydrocarbon such as benzene, toluene and the like. Alternatively, the alkylation can be effected in the presence of an alkali metal alkoxide such as potassium t-butoxide and the like, and an inert organic solvent such as tetrahydrofuran, dioxane, ether, and the like. There is thus obtained the corresponding O-aminoalkyl ether of the 6β-alkoxy-3,5-cyclopregnane-20-ol having the formula:

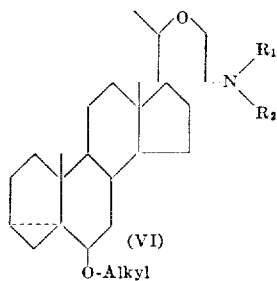

(VI)

The compound (VI) is converted to the desired compound I wherein R=H, A=O and $R_1$ and $R_2$ are as above defined, by treatment with (a) excess aqueous formic acid or excess aqueous mineral acid at room temperature or at elevated temperature followed by treatment with strong alkali such as aqueous sodium hydroxide, potassium hydroxide and the like, or (b) zinc acetate in the presence of acetic acid, preferably at elevated temperature, followed by treatment with strong alkali such as aqueous sodium hydroxide, potassium hydroxide, and the like.

The compounds of Formula II wherein A is O and $R_4$, $R_5$ and $R_6$ are as above defined can be obtained from the corresponding 3-hydroxy compounds of Formula I (R=H) using the thiation and alkylation procedures described above for the corresponding conversions of the compounds of Formula I wherein R=H, and $$A = -CH_2-$$

The compounds of the invention having the Formula III wherein $R_3$, A, $R_1$ and $R_2$ have the significance hereinbefore defined can be prepared by direct hydrogenation of the correspondingly substituted compounds having the Formula I. The hydrogenation can be effected by methods well known in the art for the hydrogenation of Δ⁵-steroid bonds. Preferably the hydrogenation is carried out catalytically in the presence of a hydrogenation catalyst such as platinum, palladium-on-charcoal and the like. The desired compound having the Formula III is isolated from the reaction mixture by standard procedures, for example, by filtration followed by evaporation of the filtrate and purification of the residue by recrystallization, chromatography, or other conventional methods.

In the case of starting compounds (I) wherein $R_1$ or $R_2$ is alkenyl the above-described hydrogenation will also reduce said groups to the corresponding alkyl groups. In order to obtain compounds of the Formula III wherein $R_1$ and/or $R_2$ is alkenyl the following methods can be adopted. The compounds III wherein A=$CH_2$, $R_3$=H and $R_1$ and/or $R_2$ is alkenyl can be obtained using the Louw et al. synthesis described above for the corresponding compounds I but replacing the 3β-acyloxy-5-cholenic acid chloride employed as starting material by the corresponding 3β-acyloxy-5α-cholanic acid chloride. The free 3-hydroxy compounds so obtained can then be converted to the corresponding 3-aminoalkyl ethers

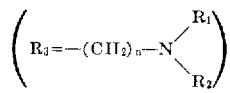

using the procedures hereinbefore described for the etherification of the corresponding 3-hydroxy compounds of Formula I.

The compounds III wherein A=O, $R_3$=H and $R_1$ or $R_2$ is alkenyl can be obtained by the following series of reactions. 5α-pregnane-3β-ol-20-one is converted to its tetrahydropyranyl ether by reaction with 2,3-dihydropyran in the presence of a trace of mineral acid such as hydrochloric acid. The ether of 5α-pregnane-3β-ol-20-one so obtained is reduced using lithium aluminum hydride, sodium borohydride, and like reducing agents as described above to obtain a mixture of the 20α- and 20β-epimers of the 3-tetrahydropyranyl ether of 5α-pregnane-3β,20-diol. The individual epimers can be separated by conventional procedures such as chromatography, countercurrent distribution and the like. The individual epimers so obtained, or the mixture of epimers, are then alkylated as described previously using the appropriately substituted aminoethyl halide $R_1R_2N$—$C_2H_4$-Hal wherein $R_1$, $R_2$ and Hal have the significance hereinbefore defined, to obtain the 3-tetrahydropyranyl ether of the desired compound III; A=O, $R_3$=H and $R_1$ and $R_2$ are as hereinbefore defined. The tetrahydropyranyl radical is then removed by treatment with strong mineral acid to give the corresponding 3-hydroxy compound. The latter can then be acylated or alkylated as previously described.

With the exception noted below, the compounds of the invention having the Formula IV wherein Z represents carbonyl and A, $R_5$ and $R_6$ have the significance defined above, can be prepared by oxidation of the correspondingly substituted compounds of the Formula I wherein R is hydrogen. The oxidation is preferably carried out under standard Oppenauer conditions, suitably by treatment with cyclohexanone in the presence of aluminum isopropoxide in refluxing toluene. The desired 3-keto compounds of Formula III are isolated and purified by conventional procedures, for example, solvent extraction followed by chromatography and/or recrystallization or other conventional procedures.

In the case where one or both of the radicals $R_5$ and $R_6$ in the desired compound IV (Z=carbonyl) represent hydrogen (i.e., one or two free hydrogen atoms are present on the nitrogen atom) it is necessary either to conduct the oxidation under acid conditions, e.g., using chromic acid in sulfuric acid or to convert the appropriate starting material I (R=H; one or both of $R_1$ and $R_2$=H) to the corresponding N-acyl derivative using the procedure described above (acylation followed by preferential hydrolysis of the O-acyl group) before carrying out the above-described oxidation of the 3-hydroxy to the 3-keto group. When the oxidation has been completed, the protecting acyl radical or radicals can be removed by hydrolysis using conventional procedures.

The compounds of the invention having the Formula IV wherein Z represents >C=NOH and A, $R_5$ and $R_6$ have the significance defined above, can be prepared from the corresponding 3-keto compounds (prepared as described above) by procedures well known in the art for the preparation of oximes. Thus, the 3-keto compound is treated with hydroxylamine or a mineral acid salt thereof such as the hydrochloride or sulfate, in a suitable solvent such as a lower alkanol, for example, methanol, ethanol, propanol, isopropanol, butanol, preferably in the presence of a basic reagent such as a tertiary amine, for example, pyridine or an alkali metal hydroxide such as sodium or potassium hydroxide, or an alkali metal carbonate or acetate. Preferably the hydroxylamine or salt thereof is employed in excess of the stoichiometric amount. The reaction can be conducted at room temperature (25° C.) or at elevated temperature and is preferably conducted at temperatures at or near the reflux temperature of the reaction mixture.

The desired oxime can be isolated from the reaction mixture by conventional procedures, for example, by pouring the reaction mixture into water and isolating the resulting precipitate. If desired, the oxime can be purified by chromatography and/or recrystallization or like conventional procedures.

The compounds of the invention having the Formula IV wherein Z is hydroxymethylene, and A, $R_5$ and $R_6$ are as hereinbefore defined can be prepared from the corresponding 3-keto compounds (Z=carbonyl) by reduction using reducing agents well known in the art for the reduction of $\Delta^4$-3-keto steroids to the corresponding $\Delta^4$-3-hydroxy steroids. The preferred reduced agent is lithium aluminum hydride and the reduction is carried out in the presence of an inert organic solvent such as ether, tetrahydrofuran and the like. The desired reaction product is isolated from the reaction mixture by conventional procedures, for example, by decomposing the excess reducing agent with a carbonyl agent such as ethyl acetate following the addition of excess aqueous alkali metal hydroxide such as sodium hydroxide, separation of the organic layer and evaporation of the latter. The product so obtained is normally a mixture of the 3α- and 3β-epimers of the desired 3-hydroxy compound of Formula IV. This mixture can be separated into its component parts by conventional procedures such as chromatography, counter-current distribution, fractional crystallization and the like.

The N-oxides of the invention, i.e., the N-oxides of those compounds of Formulae I, III, and IV wherein the N atom in the 25-position is tertiary, can be prepared from the corresponding amino compounds by conventional procedures, for example, by reaction of the latter with hydrogen peroxide. The reaction is normally conducted in an organic solvent such as methanol, ethanol, isopropanol, and like lower-alkanols, acetone and ethyl acetate. The reaction is preferably carried out at room temperature (ca. 25° C.) but temperatures from about 0° to about 80° C. can be employed if desired. The hydrogen peroxide is generally employed in excess of the stoichiometric quantity and in the commercially available 30 percent by volume concentration, but other concentrations of hydrogen peroxide, either higher or lower, can also be employed. The reaction is allowed to proceed to completion, generally for a time of the order of several hours, at the end of which period the excess hydrogen peroxide is decomposed by the addition of a catalyst such as platinum oxide, platinum, palladium, Raney nickel or a reducing agent, for example, inorganic hydrosulfites, such as sodium hydrosulfite and the like. The excess reducing agent is removed, for example, by filtration, and the desired N-oxide is isolated from the reaction mixture, for example, by evaporation of the solvent, and is purified, if necessary, by conventional procedures such as by recrystallization.

The acid addition salts of the invention, including those of the N-oxides described above, can be prepared from the corresponding free bases of Formulae I, II, III and IV by procedures well known in the art, for example, by direct reaction of the free base with the appropriate acid in solution in a suitable solvent or by a process of metathesis.

The following preparations and examples illustrate the best mode contemplated by the inventor for carrying out his invention, but are not to be construed as limiting the scope thereof.

PREPARATION 1

*3-p-toluenesulfonate of 3β-hydroxy-5-cholenic acid, methyl ester*

To a solution of 100 g. of the known compound, methyl 3β-hydroxy-5-cholenate, in 450 ml. of pyridine, was added 80 g. of p-toluenesulfonyl chloride at room temperature and the reaction mixture stirred for a period of about 18 hours, or until the sulfonation reaction was completed. The solution was then diluted to a volume of about 9 l. with water and the product extracted with methylene chloride. The extracts were washed successively with water, dilute hydrochloric acid and saturated sodium chloride solution, then dried over sodium sulfate and evaporated to dryness in vacuo to give a crystalline residue. The residue was recrystallized from a mixture of acetone and Skellysolve B (hexanes) and treated with Darco (activated carbon) to give 104.8 g. of product melting at 118.5 to 120.5° C. A sample was recrystallized for analysis and yielded the pure 3-p-toluenesulfonate of 3β-hydroxy-5-cholenic acid methyl ester with a melting point of 119.5 to 121.0° C. The infrared spectrum of the purified product was consistent with its expected structure.

*Analysis.*—Calcd. for $C_{32}H_{44}O_5S$: C, 71.07; H, 8.20; S, 5.93. Found: C, 71.01; H, 8.30; S, 5.89.

PREPARATION 2

*Methyl 6β-methoxy-3,5-cyclocholanate*

58 g. of the 3-p-toluenesulfonate of 3β-hydroxy-5-cholenic acid methyl ester and 58 g. of potassium acetate were heated together in 1.45 l. of refluxing methanol for a period of about 3.5 hours (or until the i-steroid rearrangement had gone to completion). About 1 l. of solvent was distilled off, 250 ml. of water added and the residual methanol removed under reduced pressure. The residual product was extracted with methylene chloride. After washing the extracts first with water, next with saturated sodium chloride solution and then drying ($Na_2SO_4$), the solvent was distilled under reduced pressure to give a solid residue. The residue was dissolved in methanol, treated with Darco and crystallized at −20° C. to yield 26 g. of crude product having a melting point of 63.0 to 67.5° C. An analytical sample was obtained by recrystallizing (in the same manner) a portion of the crude product; this procedure yielded pure methyl 6β-methoxy-3,5-cyclocholanate with a melting point of 71.0 to 72.5° C. and an infrared spectrum consistent with the expected structure.

*Analysis.*—Calcd. for $C_{26}H_{42}O_3$: C, 77.56; H, 10.52. Found: C, 77.58; H, 10.60.

PREPARATION 3

*6β-methoxy-3,5-cyclocholan-24-ol*

30 g. of methyl 6β-methoxy-3,5-cyclocholanate in 300 ml. of ether was added dropwise to a suspension of 3 g. of lithium aluminum hydride in 300 ml. of ether. After the addition of steroid was completed, the mixture was heated to reflux for a period of about one hour, or until the reduction was completed, and then cooled to the temperature of ice. The excess lithium aluminum hydride was destroyed with 15 ml. of ethyl acetate, followed by the dropwise addition of 25 ml. of 3 M hydrochloric acid. The ether solution was separated, washed consecutively with dilute hydrochloric acid, 4 percent sodium bicarbonate solution, saturated sodium chloride solution, then dried over sodium sulfate and evaporated to dryness under reduced pressure. The crystalline residue was recrystallized twice to provide an analytical sample of pure 6β-methoxy-3,5-cyclocholan-24-ol with a melting point of 93.5 to 96.5° C. and an infrared spectrum consistent with the expected structure of the compound.

*Analysis.*—Calcd. for $C_{25}H_{42}O_2$: C, 80.15; H, 11.30. Found: C, 80.18; H, 11.34.

EXAMPLE 1

*24-morpholino-3β-hydroxy-5-cholene*

To a mixture of 20.8 g. (0.05 mole) of 3β-acetoxy-5-cholenic acid (British Patent 453,773) in 200 ml. of dry tetrahydrofuran and 10 drops of pyridine at 0° C. is added, with stirring, 35 ml. of oxalyl chloride. The resulting mixture is stirred at 0° C. for a further 30 minutes and then at approximately 25° C. for 45 minutes before being concentrated to near dryness using a rotating evaporator at a temperature below 25° C. To the residue is added 200 ml. of benzene and the mixture is again concentrated to near dryness at a temperature below 25° C. The residue is dissolved in 500 ml. of anhydrous benzene and is added with stirring to a solution of 8.7 g. (0.1 mole) of morpholine in 700 ml. of benzene maintained at about 5° C. After the addition is complete, the reaction mixture is stirred and allowed to warm to room temperature (ca. 25° C.) during a period of 1 hour before being washed successively with water, dilute hydrochloric acid, dilute sodium hydroxide, and water. The washed solution is dried over anhydrous sodium sulfate and filtered. The filtrate is evaporated to dryness under reduced pressure and the residue is recrystallized from aqueous ethanol. There is thus obtained the morpholide of $3\beta$-acetoxy-5-chlolenic acid in the form of a crystalline solid.

A warm solution containing 0.05 mole of the above amide in 250 ml. of dry tetrahydrofuran is added dropwise over a period of about 6 hours to a stirred and refluxing mixture of 15 g. of lithium aluminum hydride in 1500 ml. of anhydrous ether. The resulting mixture is then heated under reflux for approximately 30 hours before decomposing the excess lithium aluminum hydride by the cautious addition of 70 ml. of ethyl acetate, followed by 15 ml. of water and 60 ml. of 30 percent sodium hydroxide solution. The mixture so obtained is filtered and the filtrate is cooled and treated, with stirring, with excess hydrogen chloride. The solid hydrochloride which separates is isolated by filtration, dissolved in 150 ml. of warm methanol and treated with a slight excess of methanolic potassium hydroxide. The resulting solution is cooled and diluted slowly with water. The solid which separates is isolated by filtration, dried, and recrystallized from aqueous ethanol. There is thus obtained 24-morpholino-$3\beta$-hydroxy-5-cholene in the form of a crystalline solid.

Using the above procedure but replacing morpholine by (2-hydroxyethyl)methylamine,
monoethanolamine,
diethanolamine,
3-amino-1-propanol,
1-amino-2-propanol,
1-isoamylamino-2-propanol,
1-isopropylamino-2-propanol,
4-amino-1-butanol,
2-allylamino-1-butanol,
2-butylamino-1-butanol,
2-(2-hydroxyethylamino)-1-butanol,
1-amino-2-octanol,
N-allylbutylamine,
allylamine,
N,N-diallylamine,
pyrrolidine,
2,2-dimethylpyrrolidine,
piperidine,
piperazine,
4-methylpiperazine,
2-methylmorpholine, and
trimethyleneimine
there are obtained 24-N-methyl-N-(2-hydroxyethyl)-amino-,
24-N-(2-hydroxyethyl)amino-,
24-N,N-di(2-hydroxyethyl)amino-,
24-N-(3-hydroxypropyl)amino-,
24-N-(2-hydroxypropyl)amino-,
24-N-isoamyl-N-(2-hydroxypropyl)amino-,
24-N-isopropyl-N-(2-hydroxypropyl)amino-,
24-N-(4-hydroxybutyl)amino-,
24-N-allyl-N-(1-hydroxy-2-butyl)amino-,
24-N-butyl-N-(1-hydroxy-2-butyl)amino-,
24-N-(2-hydroxyethyl)-N-(1-hydroxy-2-butyl)amino-,
24-N-(1-hydroxyoctyl)amino-,
24-N-allyl-N-butylamino-,
24-N-allylamino-,
24-N,N-diallylamino-,
24-pyrrolidino-,
24-(2,2-dimethylpyrrolidino)-,
24-piperidino-,
24-piperazino-,
24-(4-methylpiperazino)-,
24-(2-methylmorpholino)-, and
24-trimethyleneimino-$3\beta$-hydroxy-5-cholene, respectively.

EXAMPLE 2

*24-morpholino-$3\beta$-hydroxy-5-cholene*

A. A mixture of 37.4 g. of $6\beta$-methoxy-3,5-cyclocholan-24-ol, 20.0 g. of p-toluenesulfonyl chloride and 100 ml. of dry pyridine is stirred under nitrogen at approximately 25° C. for 5 to 7 hours. The resulting mixture is cooled in an ice-bath and 10 ml. of water is added slowly with stirring. The mixture so obtained is stirred for a short period before being diluted with a mixture of methylene chloride (1 part) and ether (2 parts). The organic layer is washed successively with 1.5 l. of ice-water containing 115 ml. of concentrated hydrochloric acid, water, aqueous sodium bicarbonate solution, and water. The washed organic solution is dried over anhydrous sodium sulfate and the dried solution is filtered and evaporated to dryness under reduced pressure.

B. The above residue ($6\beta$-methoxy-3,5-cyclocholan-24-ol 24-p-toluenesulfonate) is dissolved with stirring and cooling in 435 g. of morpholine and the resulting mixture is stirred at room temperature (25° C) overnight and is then heated on a steam bath with stirring for 8 hours. The mixture so obtained is cooled, treated with a solution of 4.4 g. of sodium hydroxide in 10 ml. of water and concentrated under reduced pressure to remove the bulk of the excess amine. The residue is dissolved in a mixture of methylene chloride and ether and the resulting solution is washed well with water before being dried and evaporated to dryness.

C. The above residue (24-morpholino-$6\beta$-methoxy-3,5-cyclocholane) is then subjected to rearrangement by one of the following methods.

(a) The residue obtained as described above is heated with stirring at 50° C. for several hours with 0.5 N perchloric acid. The resulting mixture is cooled, made alkaline by the addition of a slight excess of sodium hydroxide solution and extracted with ether. The ether solution is washed with water, dried over anhydrous sodium sulfate, and evaporated to dryness. The residue is recrystallized from aqueous ethanol. There is thus obtained 24-morpholino-$3\beta$-hydroxy-5-cholene in the form of a crystalline solid identical with the material obtained as described in Example 1.

(b) The residue obtained as described above is heated at 40 to 80° C. for several hours with 50 percent aqueous formic acid. The mixture is cooled and made alkaline by the addition of a slight excess of aqueous sodium hydroxide. The solid which separates is isolated by filtration and heated with a mixture of 200 ml. of 5 percent methanolic potassium hydroxide solution and 10 ml. of water for 1 hour. The resulting mixture is concentrated to about 100 ml. then cooled and diluted slowly with water. The solid which separates is isolated by filtration to yield 24-morpholino-$3\beta$-hydroxy-5-cholene which is purified by recrystallization as described under (a) above.

(c) A mixture of the residue obtained as described above with 5 g. of zinc acetate dihydrate and 50 ml. of glacial acetic acid is stirred and heated under reflux for several hours. The resulting mixture is diluted with water and sufficient ammonium hydroxide is added to neutralize the acid and dissolve the precipitate of zinc hydroxide. The mixture so obtained is extracted with methylene chloride and the organic extract is washed with water, dried over anhydrous sodium sulfate and concentrated under reduced pressure. There is thus obtained the 3β-acetate of 24-morpholino-3β-hydroxy-5-cholene which is purified by recrystallization from aqueous ethanol. The 3β-acetate so obtained can be saponified by heating with 5 percent methanolic potassium hydroxide solution under reflux for several hours to yield 24-morpholino-3β-hydroxy-5-cholene identical with the material obtained as described in Example 1.

Using the above procedure but replacing morpholine by (2-hydroxyethyl)methylamine,
monoethanolamine,
diethanolamine,
3-amino-1-propanol,
1-amino-2-propanol,
1-isoamylamino-2-propanol,
1-isopropylamino-2-propanol,
4-amino-1-butanol,
2-allylamino-1-butanol,
2-butylamino-1-butanol,
2-(2-hydroxyethylamino)-1-butanol,
1-amino-2-octanol,
N-allylbutylamine,
allylamine,
N,N-diallylamine,
pyrrolidine,
2,2-dimethylpyrrolidine,
piperidine,
piperazine,
4-methylpiperazine,
2-methylmorpholine, and trimethyleneimine there are obtained 24-N-methyl-N-(2-hydroxyethyl)amino-,
24-N-(2-hydroxyethyl)amino-,
24-N,N-di(2-hydroxyethyl)amino-,
24-N-(3-hydroxypropyl)amino-,
24-N-(2-hydroxypropyl)amino-,
24-N-isoamyl-N-(2-hydroxypropyl)amino-,
24-N-isopropyl-N-(2-hydroxypropyl)amino-,
24-N-(4-hydroxybutyl)amino-,
24-N-allyl-N-(1-hydroxy-2-butyl)amino-,
24-N-butyl-N-(1-hydroxy-2-butyl)amino-,
24-N-(2-hydroxyethyl)-N-(1-hydroxy-2-butyl)amino-,
24-N-(1-hydroxyoctyl)amino-,
24-N-allyl-N-butylamino-,
24-N-allylamino-,
24-N,N-diallylamino-,
24-pyrrolidino-,
24-(2,2-dimethylpyrrolidino)-,
24-piperidino-,
24-piperazino-,
24-(4-methylpiperazino)-,
24-(2-methylmorpholino)-, and 24-trimethyleneimino-3β-hydroxy-5-cholene, respectively, and the corresponding 3β-acetates of the above-named compounds.

EXAMPLE 3

*3β-propionate of 24-morpholino-3β-hydroxy-5-cholene*

A mixture of 0.01 mole of 24-morpholino-3β-hydroxy-5-cholene, 0.02 mole of propionic anhydride and 25 ml. of pyridine is stirred and allowed to stand at approximately 25° C. overnight. The resulting mixture is diluted slowly with 150 ml. of water containing 0.02 mole of sodium carbonate and, after stirring for a short period, the product is isolated by filtration and recrystallized from aqueous ethanol. There is thus obtained the 3β-propionate of 24-morpholino-3β-hydroxy-5-cholene in the form of a crystalline solid.

Similarly, by reacting 24-morpholino-3β-hydroxy-5-cholene with the appropriate hydrocarbon carboxylic acid anhydride or halide in the presence of pyridine or like tertiary bases there are obtained other 3β-acylates thereof such as the 3β-valerate,
3β-isobutyrate,
3β-tert-butylacetate,
3β-caproate,
3β-caprylate,
3β-decanoate,
3β-palmitate,
3β-stearate,
3β-acrylate,
3β-crotonate,
3β-hexynoate,
3β-oleate,
3β-cyclopentylpropionate,
3β-benzoate,
3β-phenylacetate,
3β-cinnamate,
3β-p-butoxyphenylpropionate,
3β-succinate,
3β-glutarate, and the like.

Similarly, using the above procedure and reacting any of the 24-substituted-amino-3β-hydroxy-5-cholenes listed in the last paragraph of Example 1, with the appropriate hydrocarbon carboxylic acid anhydride or acid halide in the presence of pyridine or like tertiary amines, there are obtained the corresponding 24-substituted-amino-3β-hydroxy-5-cholene 3β-acylates. In cases where the starting material contains a free hydrogen atom on the 24-position nitrogen, acylation at this position will occur. Similarly, where the 24-position nitrogen is substituted by hydroxyalkyl, acylation of this hydroxyl will also occur.

EXAMPLE 4

*24-diethylamino-3β-(2-diethylaminoethoxy)-5-cholene*

A. A mixture of 50 g. of 6β-methoxy-3,5-cyclocholan-24-ol, 1500 ml. of benzene, 150 ml. of ethylene glycol and 2 g. of p-toluenesulfonic acid is stirred and boiled vigorously under an efficient fractionating column and variable take-off distillation head until no more methanol distills from the reaction mixture. The mixture is then cooled, treated with 5 ml. of pyridine and washed with aqueous sodium carbonate and then with water. The organic solution is dried and evaporated to dryness. The residue is recrystallized from acetone-Skellysolve B to yield 3β-(2-hydroxyethoxy)-5-cholen-24-ol in the form of a crystalline solid.

B. A mixture of 0.05 mole of the 3β-(2-hydroxyethoxy)-5-cholen-24-ol so obtained, 20 g. of p-toluenesulfonyl chloride and 100 ml. of dry pyridine is stirred at room temperature (25° C.) for several hours in an atmosphere of nitrogen. The mixture is cooled in an ice bath and treated with stirring with 10 ml. of water followed shortly by a mixture of methylene chloride (1 part) and ether (2 parts). The organic layer is separated and washed successively with excess dilute hydrochloric acid, water, aqueous sodium bicarbonate solution, and water. The washed solution is dried over anhydrous sodium sulfate and evaporated to dryness. The residue [3β-(2-hydroxyethoxy)-5-cholen-24-ol bis-p-toluenesulfonate] is then treated with stirring with 365 g. of diethylamine and the mixture is allowed to stand overnight at room temperature before being heated on a steam bath for 8 hours. The resulting mixture is cooled and treated with a solution of 4.4 g. of sodium hydroxide in 10 ml. of water. The mixture so obtained is concentraed under reduced pressure to remove excess diethylamine and the residue is dissolved in ether, washed with water and concentrated. The residue is recrystallized from aqueous ethanol. There is thus obtained 24-diethylamino-3β-(2-diethylaminoethoxy)-5-cholene in the form of a crystalline solid.

Using the above procedure but replacing diethylamine by ammonia (as an absolute ethanol solution; reaction at room temperature), dimethylamine (as an absolute ethanol solution; reaction at room temperature), diisobutylamine,
octylamine,
diethanolamine,
ethanolamine,
3-amino-1-propanol,
di-allylamine,
N-allylbutylamine,
pyrrolidine,
2,2-dimethylpyrrolidine,
piperidine,
piperazine, and
morpholine, there are obtained
24-amino-3β-(2-aminoethoxy)-5-chlolene,
24-dimethylamino-3β-(2-dimethylaminoethoxy)-5-cholene,
24-disobutylamino-3β-(2-diisobutylaminoethoxy)-5-cholene,
24-octylamino-3β-(2-octylaminoethoxy)-5-cholene,
24-N,N-di(2-hydroxyethyl)amino-3β-[2-N,N-di(2-hydroxyethyl)aminoethoxy]-5-cholene,
24-N-(2-hydroxyethyl)amino-3β-[2-N-(2-hydroxyethyl)aminoethoxy]-5-cholene,
24-N-(3-hydroxypropyl)amino-3β-[2-N-(3-hydroxypropyl)aminoethoxy]-5-cholene,
24-N,N-diallylamino-3β-(2-N,N-diallylaminoethoxy)-5-cholene,
24-N-allyl-N-butylamino-3β-(2-N-allyl-N-butylaminoethoxy)-5-cholene,
24-pyrrolidino-3β-(2-pyrrolidinoethoxy)-5-cholene,
24-(2,2-dimethylpyrrolidino)-3β-[2-(2,2-dimethylpyrrolidino)ethoxy]-5-cholene,
24-piperidino-3β-(2-piperidinoethoxy)-5-cholene,
24-piperazino-3β-(2-piperazinoethoxy)-5-cholene, and
24-morpholino-3β-(2-morpholinoethoxy)-5-cholene, respectively.

EXAMPLE 5

*24-diethylamino-3β-(3-diethylamino-propoxy)-5-cholene*

Using the procedure described in Example 4, but replacing ethylene glycol by propane-1,3-diol, there is obtained 24-diethylamino-3β-(3 - diethylaminopropoxy)-5-cholene in the form of a crystalline solid.

Similarly, using the procedure of Example 4, but replacing ethylene glycol by butane-1,4-diol, and hexane-1,6-diol, there are obtained 24 - diethylamino-3β-(4-diethylaminobutoxy)-5-cholene, and 24-diethylamino-3β-(6-diethylaminohexyloxy)-5-cholene, respectively.

EXAMPLE 6

*24-morpholino-3β-(2-diethylaminoethoxy)-5-cholene*

A. A mixture of 0.10 mole of 24-morpholino-6β-methoxy-3,5-cyclocholane (prepared as described in Example 2), 1000 ml. of 1,2-dimethoxyethane, 150 ml. of ethylene glycol and 0.11 mole of p-toluenesulfonic acid is stirred and boiled vigorously under an efficient fractionating column and variable take-off distillation head until no further methanol distills from the reaction mixture. The reaction mixture is then cooled and treated with 5 ml. of pyridine before being concentrated under reduced pressure to a volume of about 500 ml. The concentrate is diluted with a large volume of ether and washed with excess dilute aqueous sodium hydroxide solution followed by water. The washed solution is dried over anhydrous sodium sulfate and evaporated to dryness under reduced pressure. The residue is recrystallized from aqueous ethanol to obtain 24-morpholino-3β-(2-hydroxyethoxy)-5-cholene in the form of a crystalline solid.

B. A mixture of 0.10 mole of the 24-morpholino-3β-(2-hydroxyethoxy)-5-cholene so obtained, 20 g. of p-toluenesulfonyl chloride and 100 ml. of dry pyridine is stirred under nitrogen at approximately 25° C. for 3 hours. The resulting mixture is cooled in an ice-bath and 10 ml. of water is added. After stirring the mixture so obtained for a short period an excess of aqueous sodium bicarbonate solution is added. The solid which separates is isolated by filtration and washed with water. The crude p-toluenesulfonate of 24-morpholino-3β-(2-hydroxyethoxy)-5-cholene so obtained is then stirred with 500 g. of diethylamine until the steroidal starting material dissolves. The mixture is allowed to stand overnight at room temperature and is then heated on the steam bath for 8 hours. The cooled reaction mixture is treated with a solution of 4.4 g. of sodium hydroxide in 10 ml. of water and the mixture is concentrated under reduced pressure to remove excess diethylamine. The residue is dissolved in a mixture of methylene chloride and ether and the resulting solution is washed with water and dried over anhydrous sodium sulfate. The dried solution is filtered and evaporated to dryness. The residue is recrystallized from aqueous ethanol to obtain 24-morpholino-3β-(2-diethylaminoethoxy)-5-cholene in the form of a crystalline solid.

Using the above procedure, but replacing diethylamine by diisobutylamine,
hexylamine,
octylamine,
di-allylamine,
pyrrolidine,
piperidine,
piperazine,
morpholine,
thiamorpholine,
ethanolamine,
diethanolamine and
3-aminopropane-1-ol, there are obtained
24-morpholino-3β-(2-N,N-diisobutylaminoethoxy)-5-cholene,
24-morpholino-3β-(2-N-hexylaminoethoxy)-5-cholene,
24-morpholino-3β-(2-N-octylaminoethoxy)-5-cholene,
24-morpholino-3β-(2-N,N-diallylaminoethoxy)-5-cholene,
24-morpholino-3β-(2-pyrrolidinoethoxy)-5-cholene,
24-morpholino-3β-(2-piperidinoethoxy)-5-cholene,
24-morpholino-3β-(2-piperazinoethoxy)-5-cholene,
24-morpholino-3β-(2-morpholinoethoxy)-5-cholene,
24-morpholino-3β-(2-thiamorpholinoethoxy)-5-cholene,
24-morpholino-3β-[2-(2-hydroxyethyl)aminoethoxy]-5-cholene,
24-morpholino-3β-[2-di(2-hydroxyethyl)aminoethoxy]-5-cholene, and
24-morpholino-3β-[2-di(3-hydroxypropyl)aminoethoxy]-5-cholene, respectively.

Similarly, using the procedure of Example 6, but replacing 24-morpholino-6β-methoxy-3,5-cyclocholane by other 24-substituted amino-6β-methoxy-3,5-cyclocholanes (prepared from 6β-methoxy-3,5-cyclocholan-24-ol p-toluenesulfonate and the appropriate amine according to the procedure described in Example 2), replacing ethylene glycol, if desired, by other alkanediols, and replacing diethylamine by other alklamines, alkenylamines, hydroxyalkylamines or heterocyclic amines, there are prepared the corresponding 24-substituted amino-3β-aminoalkoxy-5-cholenes of the invention.

EXAMPLE 7

*24-monomethylamino-3β-(2-diethylaminoethoxy)-5-cholene*

A. 24-monomethylamino-6β-methoxy-3,5-cyclocholane.
Using the procedure described in Example 2, parts A and B, but replacing morpholine by a solution of methylamine in absolute alcohol and conducting the amination at room temperature for several days, there is obtained 24-monomethylamino-6β-methoxy-3,5-cyclocholane in the form of a crystalline solid.

B. 24-monomethylamino-3β - (2 - hydroxyethoxy) - 5-cholene.

Using the procedure described in Example 6, part A, but replacing 24-morpholino-6β-methoxy-3,5-cyclocholan-24-ol by 24-monomethylamino-6β-methoxy - 3,5 - cyclocholane, there is obtained 24-monomethylamino-3β-(2-hydroxyethoxy)-5-cholene in the form of a crystalline solid.

C. 24-N-methyl-N-acetylamino-3β - (2-hydroxyethoxy)-5-cholene.

A mixture of 0.10 mole of 24-monomethylamino-3β-(2-hydroxyethoxy)-5-cholene, 250 ml. of pyridine and 0.4 mole of acetic anhydride is stirred at room temperature overnight. The resulting mixture is cooled, diluted with 20 ml. of water, and stirred for a short period before being diluted further with water followed by methylene chloride. The organic layer is separated, washed with dilute hydrochloric acid and with water and then dried over anhydrous sodium sulfate. The dried solution is evaporated and the residue is mixed with 500 ml. of methanol, 20 g. of potassium carbonate and 50 ml. of water. The mixture is stirred at room temperature for several hours before being concentrated under reduced pressure to a volume of about 200 ml. The concentrate is diluted slowly with water and the solid which separates is isolated by filtration and recrystallized from aqueous ethanol. There is thus obtained 24-N-methyl-N-acetylamino-3β-(2-hydroxyethoxy)-5-cholene in the form of a crystalline solid.

D. 24-N-methyl-N-acetylamino - 3β - (2-diethylaminoethoxy)-5-cholene.

Using the procedure described in Example 6, part B, but replacing 24-morpholino - 3β - (2-hydroxyethoxy)-5-cholene by 24-N-methyl-N-acetylamino-3β-(2-hydroxyethoxy)-5-cholene, there is obtained 24-N-methyl-N-acetylamino-3β-(2-diethylaminoethoxy)-5-cholene.

E. 24-N-methylamino-3β - (2-diethylaminoethoxy)-5-cholene.

A mixture of 0.01 mole of 24-N-methyl-N-acetylamino-3β-(2-diethylaminoethoxy)-5-cholene, 100 ml. of methanol and 50 ml. of 40 percent aqueous potassium hydroxide solution is heated under reflux under nitrogen for several hours. The resulting mixture is concentrated by distillation to about two thirds volume and is then cooled and diluted with water. The solid which separates is isolated by filtration and recrystallized from aqueous ethanol. There is thus obtained 24-N-methylamino-3β-(2-diethylaminoethoxy)-5-cholene in the form of a crystalline solid.

Using the above procedure, but replacing 24-monomethylamino-6β-methoxy-3,5-cyclocholane by other 24-mono-alkyl-, or mono-alkenyl-6β-methoxy-3,5-cyclocholanes there are obtained the corresponding 24-mono-substituted amino-3β-(2-diethylaminoethoxy)-5-cholenes such as 24-N-ethylamino-, 24-N-isopropylamino-, 24-N-allylamino- and 24-N-hexylamino-3β-(2-diethylaminoethoxy)-5-cholenes.

EXAMPLE 8

*24-N,N-dimethylamino-3β-mercapto-5-cholene*

A mixture of 24-N,N-dimethylamino-3β-hydroxy-5-cholene p-toluenesulfonate (prepared from 24-dimethylamino-3β-hydroxy-5-cholene and p-toluenesulfonyl chloride using the procedure described in Example 6, part B), 90 g. of thiourea, 50 ml. of pyridine and 500 ml. of absolute ethanol is heated under reflux for several hours. The resulting solution is diluted with water to incipient crystallization, cooled and filtered. The solid which separates is isolated by filtration and suspended in boiling acetone. The insoluble material is filtered and washed with acetone. The solid so obtained is then heated under reflux with 6.8 g. of sodium hydroxide and 500 ml. of ethanol until the solution becomes homogeneous. When this occurs, 50 ml. of water is added and heating is continued for several hours. The resulting reaction mixture is poured into ice water containing sufficient glacial acetic acid to liberate the free mercaptan. The solid which separates is isolated by filtration and recrystallized from aqueous ethanol. There is thus obtained 24-dimethylamino-3β-mercapto-5-cholene in the form of a crystalline solid.

Using the above procedure, but replacing the p-toluenesulfonate of 24-dimethylamino-3β-hydroxy-5-cholene by the p-toluenesulfonates (prepared according to the procedure described in Example 6, part B) of 24-N,N-diethylamino-, 24-N,N-diisopropylamino-, 24-N-allyl-N-butylamino-, 24-N,N-diallylamino-, 24-pyrrolidino-, 24-(2,2-dimethylpyrrolidino)-, 24-piperidino-, 24-(4-methylpiperazino)-, 24-morpholino-, 24-(2-methylmorpholino)-, and 24-trimethyleneimino-3β-hydroxy-5-cholenes, there are obtained 24-N,N-diethylamino-, 24-N,N-diisopropylamino-, 24-N-allyl-N-butylamino-, 24-N,N-diallylamino-, 24-pyrrolidino-, 24-(2,2-dimethylpyrrolidino)-, 24-piperidino-, 24-piperazino-, 24-(4-methylpiperazino)-, 24-morpholino-, 24-(2-methylmorpholino)-, and 24-trimethyleneimino-3β-mercapto-5-cholenes.

EXAMPLE 9

*24-N,N-dimethylamino-3β-(2-diethylaminoethylthio)-5-cholene*

To a solution of 5.62 g. of potassium t-butoxide in 200 ml. of tetrahydrofuran is added a solution of 0.05 mole of 24-N,N-dimethylamino-3β-mercapto-5-cholene in the minimum volume of tetrahydrofuran. The resulting mixture is stirred for a few minutes before 0.055 mole of 2-diethylaminoethyl chloride is added slowly with stirring. The mixture so obtained is heated under reflux for several hours before being treated with a small quantity of water and concentrated to a volume of about 100 ml. The concentrate is extracted with ether and the ethereal extract is washed with aqueous sodium hydroxide solution and with water. The washed ether solution is dried and evaporated to dryness and the residue is recrystallized from aqueous alcohol. There is thus obtained 24-dimethylamino-3β-(2-diethylaminoethylthio)-5-cholene in the form of a crystalline solid.

Using the above procedure, but replacing 2-diethylaminoethyl chloride by 2-dimethylaminoethyl chloride, 2-diethylaminopropyl chloride, 2-pyrrolidinoethyl chloride, 2-morpholinoethyl chloride, and 2-piperidinoethyl chloride there are obtained 24-dimethylamino-3β-(2-dimethylaminoethylthio)-5-cholene, 24 - dimethylamino-3β-(2-diethylaminopropylthio)-5-cholene, 24 - dimethylamino-3β-(2-pyrrolidinoethylthio)-5-cholene, 24-dimethylamino -3β-(2-morpholinoethylthio)-5-cholene, and 24-dimethylamino - 3β-(2-piperidinoethylthio)-5-cholene, respectively.

Similarly by reacting other 24-(substituted-amino)-3β-mercapto-5-cholenes (prepared as described in Example 8) with the appropriately substituted aminoalkyl halide using the procedure described in Example 9, there are obtained other 24 - amino (or substituted - amino) - 3β-(aminoalkylthio)-5-cholenes of the invention.

EXAMPLE 10

*22-oxa-24-N,N-diethylamino-3β-hydroxy-5-cholene*

A. 6β-methoxy-3,5-cyclopregnan-20-one.

A mixture of 0.1 mole of pregnenolone 3-p-toluenesulfonate, 0.3 mole of potassium acetate and 1.4 l. of dry methanol is stirred and refluxed for several hours. The major portion of the solvent is then removed by distillation and the concentrate is cooled and diluted slowly with water. The solid which separates is isolated by filtration and dried to yield 6β-methoxy-3,5-cyclopregnan-20-one which is employed in the next stage without further purification.

B. 6β-methoxy-3,5-cyclopregnan-20-ol.

A solution of 0.05 mole of 6β-methoxy-3,5-cyclopregnan-20-one in the minimum quantity of tetrahydrofuran is added slowly with stirring over a period of 30 minutes to a solution of 0.051 mole of diborane in 300 ml. of tetrahydrofuran maintained under nitrogen. The resulting mixture is stirred for an additional period of approximately 1 hour before being cooled and treated slowly with caution with a solution of 6 ml. of water in 25 ml. of tetrahydrofuran. The resulting mixture is diluted with excess ice-water and the solid which separates is isolated by filtration and dried. There is thus obtained a mixture of the 20α- and 20β-epimers of 6β-methoxy-3,5-cyclopregnan-20-ol. The mixture of epimers is separated by dissolving in the minimum volume of methylene chloride and the solution so obtained is chromatographed on a column of magnesium silicate (Florsil). The column is eluted with commercial hexanes (Skellysolve B) containing increasing portions of acetone and those fractions which on the basis of infrared analyses are found to contain the desired materials are combined and evaporated. There is thus obtained each of the 20α- and 20β-epimers in the form of crystalline solids.

C. 22 - oxa - 24 - N,N - diethylamino - 6β - methoxy-3,5-cyclocholane.

To a cooled solution of 0.050 mole of the 20α-epimer of 6β-methoxy-3,5-cyclopregnan-20-ol (obtained as described above) in 200 ml. of benzene under nitrogen is added with stirring 20 ml. of 2.5N n-butyllithium in heptane solution. The resulting mixture is stirred for a short period before 0.055 mole of 2-diethylaminoethyl chloride is added slowly with stirring. The mixture so obtained is stirred and heated under reflux for several hours before being cooled and diluted with 100 ml. of water. The diluted mixture is stirred for a short period and then diluted with ether. The organic layer is separated, washed with water and dried. The dried solution is evaporated to dryness to obtain the 20α-epimer of 22-oxa-24-N,N-diethylamino-6β-methoxy-3,5 - cyclocholane. The corresponding 20β-epimer can be obtained by employing the 20β-epimer of the starting steroid.

D. 22-oxa-24-N,N-diethylamino-3β-hydroxy-5-cholene.

Using the procedure described in Example 2, part C, but replacing 24-morpholino-6β-methoxy-3,5-cyclocholane by the 20α-epimer of 22-oxa-24-N,N-diethylamino-6β-methoxy-3,5-cyclocholane, there is obtained the 20α-epimer of 22-oxa-24-N,N-diethylamino-3β-hydroxy-5-cholene in the form of a crystalline solid. The corresponding 20β-epimer can be obtained by employing the 20β-epimer of the steroid starting material.

Using the above procedure, but replacing 2-diethylaminoethyl chloride employed in part C by 2-dimethylaminoethyl chloride, 2-diisopropylaminoethyl chloride, 2-pyrrolidinoethyl chloride, 2-piperidinoethyl chloride, and 2-morpholinoethyl chloride, there are obtained the 20α- and 20β-epimers of 22-oxa-24-N,N-dimethylamino-3β-hydroxy-5-cholene, 22-oxa-24-N,N-diisopropylamino-3β-hydroxy-5-cholene, 22-oxa-24-pyrrolidino-3β-hydroxy-5-cholene, 22-oxa-24-piperidino-3β-hydroxy-5-cholene, 22-oxa-24-piperazino-3β-hydroxy-5-cholene, and 22-oxa-24-morpholino-3β-hydroxy-5-cholene, respectively.

EXAMPLE 11

*22-oxa-24-N,N-diethylamino-3β-(2-diethylaminoethoxy)-5-cholene*

Using the procedure described in Example 6, but replacing 24-morpholino-6β-methoxy-3,5-cyclocholane by the 20α-epimer of 22-oxa-24-N,N-diethylamino-6β-methoxy-3,5-cyclocholane (prepared as described in Example 10), there is obtained the 20α-epimer of 22-oxa-24-N,N-diethylamino-3β-(2-diethylaminoethoxy)-5-cholene in the form of a crystalline solid. The corresponding 20β-epimer can be obtained by employing the 20β-epimer of the starting steroid.

Similarly by subjecting the appropriate 22-oxa-24-(substituted amino)-6β-methoxy-3,5-cyclocholane (prepared by employing the appropriately substituted aminoethyl chloride in the procedure of Example 10, part C) with the appropriate alkylenediol according to the procedure of Example 6, part A, converting the corresponding 22-oxa-24-(substituted amino)-3β-(hydroxyalkoxy)-5-cholene to its p-toluenesulfonate according to the procedure of Example 6, part B, and reacting the p-toluenesulfonate so obtained with the appropriate amine according to the procedure of Example 6, part C, there are obtained other 22-oxa-24-(substituted amino)-3β-(aminoalkoxy)-5-cholenes such as the 20α- and 20β-epimers of 22-oxa-24-N,N - diethylamino - 3β - ( - N,N - diallylaminoethoxy)-5 - cholene, 22-oxa-24-N,N-dimethylamino-3β-(3-N,N-diethylaminopropoxy) - 5-cholene, 22-oxa-24-N,N-diisopropylamino-3β-(5-N,N-diethylaminopentoxy)-5-cholene, 22-oxa - 24 - pyrrolidino - 3β - (2 - diethylaminoethoxy) - 5-cholene, 22 - oxa - 24-piperidino-3β-(2-dimethylaminoethoxy)-5-cholene, 22-oxa-24-morpholino-3β-(2 - diethylaminoethoxy)-5-cholene, 22-oxa-24-N,N-diethylamino-3β-(2-pyrrolidinoethoxy)-5-cholene, 22 - oxa - 24 - N,N-diethylamino-3β-(2-piperidinoethoxy)-5-cholene, and 22-oxa-24-N,N-diethylamino-3β-(2-morpholinoethoxy)-5-cholene.

EXAMPLE 12

*22-oxa-24-N,N-diethylamino-3β-mercapto-5-cholene*

Using the procedure described in Example 8, but replacing 24-dimethylamino-3β-hydroxy-5-cholene p-toluenesulfonate by the 20α-epimer of 22-oxa-24-N,N-diethylamino-3β-hydroxy-5-cholene p-toluenesulfonate (prepared from the free 3-hydroxy compound and p-toluenesulfonyl chloride using the procedure described in Example 6, part B), there is obtained the 20α-epimer of 22-oxa-24-N,N-diethylamino-3β-mercapto-5-cholene in the form of a crystalline solid.

Similarly, using the procedure described in Example 8 but replacing 24-dimethylamino-3β-hydroxy-5-cholene by the p-toluenesulfonate of the appropriately substituted 22-oxa-24-amino-3β-hydroxy - 5 - cholene, there are obtained the 20α- and 20β-epimers of 22-oxa-24-N,N-dimethylamino-3β-mercapto-5-cholene, 22 - oxa-24-N,N-diisopropylamino-3β-mercapto-5-cholene, 22-oxa-24-piperidino-3β-mercapto-5-cholene, and 22-oxa-24-morpholino-3β-mercapto-5-cholene.

EXAMPLE 13

*22-oxa-24-N,N-diethylamino-3β-(2-diethylaminoethylthio)-5-cholene*

Using the procedure described in Example 9, but replacing 24-dimethylamino-3β-mercapto-5-cholene by the 20α-epimer of 22-oxa-24-N,N-diethylamino-3β-mercapto-5-cholene, there is obtained 24-N,N-diethylamino-3β-(2-diethylaminoethylthio)-5-cholene in the form of a crystalline solid. The corresponding 20β-epimer can be obtained by employing the 20β-epimer of the starting steroid.

Similarly, using the procedure of Example 9, but re-placing 24-dimethylamino-3β-mercapto-5-cholene by the appropriately substituted 22-oxa-24-amino-3β-mercapto-5-cholene, there are obtained the corresponding 22-oxa-24-amino-3β(aminoalkylthio)-5-cholenes such as the 20α- and 20β-epimers of 22-oxa-24-N,N-dimethylamino-3β-(2-diethylaminoethylthio)-5-cholene,
22-oxa-24-N,N-diisopropylamino-3β-(2-diethylaminoethylthio)-5-cholene,
22-oxa-24-pyrrolidino-3β-(2-diethylaminoethylthio)-5-cholene,
22-oxa-24-piperidino-3β-(2-diethylaminoethylthio)-5-cholene, and
22-oxa-24-morpholino-3β-(2-diethylaminoethylthio)-5-cholene.

EXAMPLE 14

*24-dimethylamino-3β-hydroxy-5α-cholane and the hydrochloride thereof*

To a solution of 0.01 mole of 24-dimethylamino-3β-hydroxy-5-cholene in 200 ml. of methanol is added a slight excess of concentrated hydrochoric acid (i.e., slight excess over the stoichiometric amount) followed by 1 g. of platinum oxide catalyst. The mixture is shaken in an atmosphere of hydrogen (ca. 30 p.s.i.) until 1 molar equivalent of hydrogen has been absorbed. The resulting mixture is filtered, the catalyst is washed on the filter with methanol and the combined filtrate and washings are evaporated to dryness. The residue is recrystallized from ethanolic tetrahydrofuran. There is thus obtained the hydrochloride of 24-dimethylamino-3β-hydroxy-5α-cholane in the form of a crystalline solid.

The corresponding free base is obtained by dissolving the above hydrochloride in the minimum volume of methanol and adding to the solution a slight excess of methanolic potassium hydroxide solution. The resulting mixture is diluted slowly with water and the solid which separates is isolated by filtration, washed with water and dried. There is thus obtained 24-dimethylamino-3β-hydroxy-5α-cholane in the form of a solid.

Using the above procedure but replacing 24-dimethylamino-3β-hydroxy-5-cholene by any of the cholenes prepared as described in Examples 1 to 7, 10 and 11, there are obtained the corresponding 5α-cholanes. Representative of the 5α-cholanes which are prepared in this manner are:

24-N-methyl-N-(2-hydroxyethyl)amino-,
24-N-(2-hydroxyethyl)amino-,
24-N-(3-hydroxypropyl)amino-,
24-N-(2-hydroxypropyl)amino-,
24-N-isoamyl-N-(2-hydroxypropyl)amino-,
24-N-isopropyl-N-(2-hydroxypropyl)amino-,
24-N-(4-hydroxybutyl)amino-,
24-N-butyl-N-(1-hydroxy-2-butyl)amino-,
24-N-(2-hydroxyethyl)-N-(1-hydroxy-2-butyl)amino-,
24-N-(1-hydroxyoctyl)amino-, 24-pyrrolidino-,
24-piperidino-, 24-piperazino-, and
24-morpholino-3β-hydroxy-5α-cholane;
24-amino-3β-(2-aminoethoxy)-,
24-dimethylamino-3β-(2-dimethylaminoethoxy)-,
24-diisobutylamino-3β-(2-diisobutylaminoethoxy)-,
24-octylamino-3β-(2-octylaminoethoxy)-,
24-N,N-di(2-hydroxyethyl)amino-3β-[2-N,N-di-
 (2-hydroxyethyl)aminoethoxy]-,
24-pyrrolidino-3β-(2-pyrrolidinoethoxy)-,
24-piperidino-3β-(2-piperidinoethoxy)-,
24-morpholino-3β-(2-morpholinoethoxy)-, and
24-diethylamino-3β-(3-diethylaminopropoxy)-5α-cholane;
22-oxa-24-N,N-diethylamino,
22-oxa-N,N-dimethylamino-,
22-oxa-24-N,N-diisopropylamino-,
22-oxa-24-pyrrolidino-,
22-oxa-24-piperidino-,
22-oxa-24-piperazino-, and
22-oxa-24-morpholino-3β-hydroxy-5α-cholane;
22-oxa-24-N,N-diethylamino-3β-(2-diethylaminoethoxy)-,
22-oxa-24-N,N-dimethylamino-3β-(3-N,N-diethylaminopropoxy)-,
22-oxa-24-N,N-diisopropylamino-3β-(5-N,N-diethylaminopentoxy)-,
22-oxa-24-pyrrolidino-3β-(2-diethylaminoethoxy)-,
22-oxa-24-piperidino-3β-(2-dimethylaminoethoxy)-,
22-oxa-24-morpholino-3β-(2-diethylaminoethoxy)-,
22-oxa-24-N,N-diethylamino-3β-(2-pyrrolidinoethoxy)-,
22-oxa-24-N,N-diethylamino-3β-(2-piperidinoethoxy)-, and
22-oxa-24-N,N-diethylamino-3β-(2-morpholinoethoxy)-5α-cholane;

together with the hydrochlorides of all the above-named compounds.

EXAMPLE 15

*24-N,N,-diethylamino-4-cholen-3-one*

A mixture of 0.05 mole of 24-N,N-diethylamino-3β-hydroxy-5-cholene, 2.1 of toluene and 200 ml. of cyclohexanone is heated to boiling and about 500 ml. of distillate is collected. To the boiling residue is added slowly with stirring over a period of 30 minutes a solution of 20 g. of aluminum isopropoxide in 700 ml. of anhydrous toluene. During the addition, distillate is collected slowly and, after the addition is complete, the mixture is boiled for a further 15 minutes with a collection of distillate. The resulting mixture is cooled and washed with several portions of aqueous dilute sodium hydroxide solution followed by water. The washed distillate is dried over anhydrous sodium sulfate and evaporated to dryness under reduced pressure. The residue is recrystallized from aqueous ethanol. There is thus obtained 24-N,N-diethylamino-4-cholene-3-one in the form of a crystalline solid.

Using the above procedure but replacing 24-N,N-diethylamino-3β-hydroxy-5-cholene by 24-N-allyl-N-butylamino-,
24-N,N-diallylamino-,
24-pyrrolidino-,
24-(2,2-dimethylpyrrolidino)-,
24-piperidino-,
24-(4-methylpiperazino)-,
24-morpholino-,
24-(2-methylmorpholino)-, and
24-trimethyleneimino-3β-hydroxy-5-cholene, there are obtained 24-N-allyl-N-butylamino-,
24-N-allylamino-,
24-N,N-diallylamino-,
24-pyrrolidino-,
24-(2,2-dimethylpyrrolidino)-,
24-piperidino-,
24-(4-methylpiperazino),
24-morpholino-,
24-(2-methylmorpholino)-, and
24-trimethyleneimino-4-cholen-3-one, respectively.

Similarly, using the procedure described in Example 15, but replacing 24-N,N-diethylamino-3β-hydroxy-5-cholene by 22-oxa-24-N,N-diethylamino-,
22-oxa-24-N,N-dimethylamino-,
22-oxa-N,N-diisopropylamino-,
22-oxa-24-pyrrolidino-,
22-oxa-24-piperidino-, and
22-oxa-24-morpholino-3β-hydroxy-5-cholene, there are obtained 22-oxa-24-N,N-diethylamino-,
22-oxa-24-N,N-dimethylamino-,
22-oxa-24-N,N-diisopropylamino-,
22-oxa-24-pyrrolidino-,
22-oxa-24-piperidino-, and
22-oxa-24-morpholino-4-cholen-3-one, respectively.

EXAMPLE 16

*24-N,N-diethylamino-4-cholene-3-one oxime*

To a solution of 0.01 mole of 24-N,N-diethylamino-4-cholen-3-one in 150 ml. of ethanol is added 12 g. of hydroxylamine hydrochloride followed by a solution of 9.7 g. of potassium hydroxide in 15 ml. of water. The resulting mixture is heated under reflux for a short period to complete the oximation and is then cooled and filtered. The filtrate is acidified by passing through it a stream of carbon dioxide and the acidified solution is concentrated under reduced pressure. The residue is diluted with water and extracted with methylene chloride. The methylene chloride extract is washed with water, dried, and evaporated to dryness. The residue is recrystallized from aqueous ethanol. There is thus obtained 24-N,N-diethylamino-4-cholen-3-one oxime in the form of a crystalline solid.

Using the above procedure but replacing 24-N,N-diethylamino-4-cholen-3-one by the appropriately substi-

23 tuted 4-cholen-3-one there are obtained the corresponding oximes. Representative of oximes so prepared are the oximes of 24-N-allyl-N-butylamino-, 24-N,N-diallylamino-, 24-pyrrolidino-, 24-(2,2-dimethylpyrrolidino)-, 24-piperidino-, 24-(4-methylpiperazino)-, 24-morpholino-, 24-(2-methylmorpholino)-, 24-trimethyleneimino-, 22-oxa-24-N,N-diethylamino-, 22-oxa-24-N,N-dimethylamino-, 22-oxa - 24-N,N-diisopropylamino-, 22-oxa-24-pyrrolidino-, 22-oxa-24-piperidino-, and 2-oxa-24-morpholino-4-cholen-3-one.

EXAMPLE 17

*24-N,N-diethylamino-4-cholen-3-ol*

A solution of 0.05 mole of 24-N,N-diethylamino-4-cholen-3-one in 200 ml. of dry tetrahydrofuran is added dropwise with stirring to a solution of 5 g. of lithium aluminum hydride in 600 ml. of anhydrous ether over a period of about 1 hour. The resulting mixture is heated under reflux for a short period to complete the reaction and is then cooled. To the cooled solution is added dropwise with stirring a solution of 25 ml. of ethyl acetate in 75 ml. of ether followed by 5 ml. of water and then by 20 ml. of 30 percent aqueous sodium hydroxide solution. The resulting mixture is stirred for a short period and then filtered. The insoluble material is washed on the filter with methylene chloride and the filtrate and washings are combined and evaporated to dryness under reduced pressure. The residue is recrystallized from aqueous ethanol. There is thus obtained 24-N,N-diethylamino-4-cholen-3β-ol in the form of a crystalline solid.

The mother liquor from the recrystallization is evaporated to dryness under reduced pressure and the residue is chromatographed on a column of magnesium silicate (Florisil). The column is eluted with Skellysolve B containing increasing proportions of acetone and those fractions which, on the basis of infrared spectrographic analysis, are found to contain the desired material are combined and evaporated to dryness. There is thus obtained 24-N,N-diethylamino-4-cholen-3α-ol in the form of a crystalline solid. There is also obtained a further quantity of the corresponding 3β-epimer.

Using the above procedure but replacing 24-N,N-diethylamino-4-cholen-3-one by the appropriately substituted 4-cholen-3-one there are obtained the 3α- and 3β-epimers of the corresponding substituted 4-cholen-3-ols. Representative of the 4-cholen-3-ols so obtained are the 3α- and 3β-epimers of 24-N-allyl-N-butyl-amino-, 24-N,N-diallylamino-, 24-pyrrolidino-, 24-(2,2-dimethylpyrrolidino)-, 24-piperidino-, 24-(4-methylpiperazino)-, 24-morpholino-, 24-(2-methylmorpholino)-, 24-trimethyleneimino-, 22-oxa-24-N,N-diethylamino-, 22-oxa-24-N,N-dimethylamino-, 22-oxa-24-N,N-diisopropylamino-, 22-oxa-24-pyrrolidino-, 22-oxa-24-piperidino-, and 22-oxa-morpholino-4-cholen-3-ol.

EXAMPLE 18

*N-oxide of 24-morpholino-3β-hydroxy-5-cholene and the hydrochloride thereof*

A solution of 0.01 mole of 24-morpholino-3β-hydroxy-5-cholene in 100 ml. of absolute ethanol is stirred and treated at room temperature (ca. 25° C.) with 20 ml. of 30 percent by volume hydrogen peroxide. The resulting mixture is stirred for 12 hours at room temperature before decomposing the excess hydrogen peroxide by the addition of 1.5 g. of platinum oxide. The resulting mixture is stirred until evolution of oxygen ceases and is then filtered. The filtrate is evaporated to dryness under reduced pressure and the residue is recrystallized from ethyl acetate. There is thus obtained the N-oxide of 24-morpholino-3β-hydroxy-5-cholene in the form of a crystalline solid.

To a cool solution of 1 g. of the 24-morpholino-3β-hydroxy-5-cholene N-oxide so obtained in 100 ml. of ether and sufficient absolute ethanol to bring the steriod into solution is added dropwise with stirring a slight excess of a 0.1 N ethereal solution of hydrogen chloride. The solid which separates is isolated by filtration, washed with ether and dried in vacuo. There is thus obtained the hydrochloride of 24-morpholino-3β-hydroxy-5-cholene N-oxide in the form of a crystalline solid.

Using the above procedure but replacing 24-morpholino-3β-hydroxy-5-cholene by other tertiary bases prepared as described in Examples 1 to 7, 10, 11 and 14 to 17, there are obtained the corresponding N-oxides and N-oxide hydrochlorides. Representative of these are the N-oxides and N-oxide hydrochlorides of
24-N,N-diallylamino-,
24-pyrrolidino-,
24-(2,2-dimethylpyrrolidino)-,
24-piperidino-, and
24-(4-methylpiperazino)-3β-hydroxy-5-cholene;
24-diethylamino-3β-(2-diethylaminoethoxy)-,
24-dimethylamino-3β-(2-dimethylaminoethoxy)-,
24-diisobutylamino-3β-(2-diisobutylaminoethoxy)-,
24-N,N-diallylamino-3β-(2-N,N-diallylaminoethoxy)-,
24-pyrrolidino-3β-(2-pyrrolidinoethoxy)-,
24-piperidino-3β-(2-piperidinoethoxy)-, and
24-morpholino-3β-(2-morpholinoethoxy)-5-cholene;
22-oxa-24-N,N-diethylamino-,
22-oxa-24-N,N-diisopropylamino-,
22-oxa-24-pyrrolidino-,
22-oxa-24-piperidino-, and
22-oxa-24-morpholino-3β-hydroxy-5-cholenes;
22-oxa-24-N,N-diethylamino-3β-(2-diethylaminoethoxy)-,
22-oxa-24-N,N-diethylamino-3β-(2-N,N-diallylaminoethoxy)-,
22-oxa-24-N,N-dimethylamino-3β-(3-N,N-diethylaminopropoxy)-,
22-oxa-24-pyrrolidino-3β-(2-diethylaminoethoxy)-,
22-oxa-24-piperidino-3β-(2-dimethylaminoethoxy)-,
22-oxa-24-morpholino-3β-(2-diethylaminoethoxy)-,
22-oxa-24-N,N-diethylamino-3β-(2-pyrrolidinoethoxy)-, and
22-oxa-24-N,N-diethylamino-3β-(2-morpholinoethoxy)-5-cholenes;
24-N-allyl-N-butylamino-,
24-N,N-diallylamino-,
24-pyrrolidino-,
24-piperidino-, and
24-morpholino-3β-hydroxy-5α-cholane and the corresponding 22-oxa analogues thereof;
24-dimethylamino-3β-(2-dimethylaminoethoxy)-,
24-pyrrolidino-3β-(2-pyrrolidinoethoxy)-,
24-piperidino-3β-(2-piperidinoethoxy)-,
24-morpholino-3β-(2-morpholinoethoxy)-, and
24-diethylamino-3β-(3-diethylaminopropoxy)-5α-cholanes and the 22-oxa analogues thereof;
24-N,N-diethylamino-,
24-N-allyl-N-butylamino-,
24-N,N-diallylamino-,
24-pyrrolidino-,
24-piperidino-,
24-(4-methylpiperazino)-, and
24-morpholino-4-cholen-3-one
and the 22-oxa analogues thereof; and the 3α- and 3β-epimers of 24-N,N-diethylamino-, 24-N-allyl-N-butylamino-, 24-N,N-diallylamino-, 24-pyrrolidino-, 24-piperidino-, 24-(4-methylpiperazino)-, and 24-morpholino-4-cholen-3-ols and the 22-oxa analogues thereof.

EXAMPLE 19

*24-morpholino-3β-hydroxy-4-cholene N-oxide hydrobromide and sulfate*

Using the procedure described in Example 18 for converting the N-oxide of 24-morpholino-3β-hydroxy-5-cholene to its hydrochloride, but replacing ethereal hydrogen chloride by ethereal hydrogen bromide or ethereal sulfuric acid, there are obtained the hydrobromide and the sulfate of 24-morpholino-3β-hydroxy-5-cholene N-oxide.

In like manner, employing any of the amines of Examples 1 to 17, inclusive, or the N-oxides of Example 18, and the appropriate acid there are obtained the corresponding acid addition salts. Illustratively, using procedures analogous to that described above the amines of Examples 1 to 17, inclusive, or the N-oxides of Example 18 are converted to their addition salts with sulfuric, hydrochloric, nitric, phosphoric, lactic, benzoic, methanesulfonic, p-toluenesulfonic, salicylic, acetic, propionic, malic, tartaric, citric, cyclohexylsulfamic, succinic, nicotinic, and ascorbic acids.

I claim:

1. A compound selected from the class consisting of (a) compounds having the formulae:

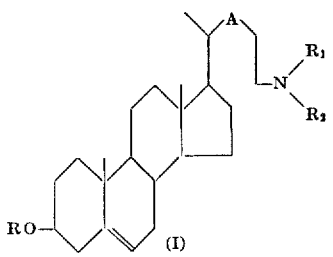
(I)

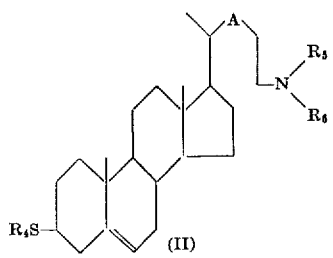
(II)

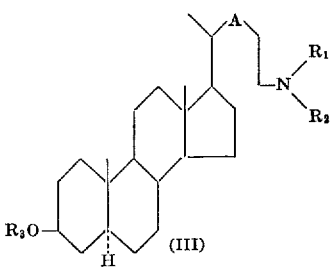
(III)

and

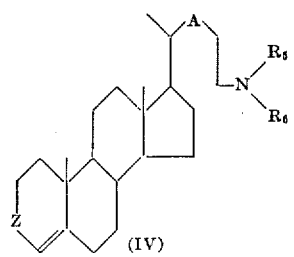
(IV)

wherein A is selected from the class consisting of —O— and —CH$_2$—, R$_1$ and R$_2$ are selected from the group consisting of hydrogen, lower-alkyl, lower-alkenyl, and lower-hydroxyalkyl, and R$_1$ and R$_2$ taken together with the attached nitrogen atom also represents a 4 to 6 ring atom heterocyclic amino radical, R is selected from the class consisting of hydrogen, acyl wherein the acyl radical is that of a hydrocarbon carboxylic acid containing from 1 to 18 carbon atoms, inclusive, and the radical

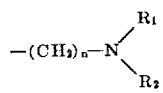

wherein $n$ is an integer from 2 to 6 and R$_1$ and R$_2$ have the significance above defined, provided that when R$_1$ and R$_2$ represent hydrogen or lower-alkyl, R represents only

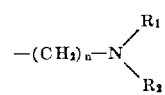

R$_3$ is selected from the class consisting of hydrogen, acyl wherein the acyl radical is that of a hydrocarbon carboxylic acid containing from 1 to 18 carbon atoms, inclusive, and the radical

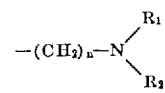

wherein $n$, and R$_1$ and R$_2$ are as defined above, provided that when A is —CH$_2$—, R$_3$ represents only

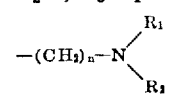

R$_4$ is selected from the class consisting of hydrogen and the radical

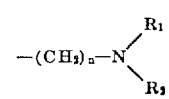

wherein R$_1$, R$_2$ and $n$ have the significance above defined, R$_5$ and R$_6$ taken individually are selected from the class consisting of lower-alkyl, and lower-alkenyl, and R$_5$ and R$_6$ taken together with the attached nitrogen atom also represent a 4 to 6 ring atom heterocyclic amino radical, Z is selected from the class consisting of carbonyl, hydroxymethylene, and >C=NOH;

(b) the pharmacologically acceptable acid addition salts of the compounds of the above formulae;

(c) the N-oxides of those compounds of the above formulae I, III and IV which contain a tertiary nitrogen atom; and (d) the pharmacologically acceptable acid addition salts of said N-oxides.

2. A member of the class consisting of compounds having the formula:

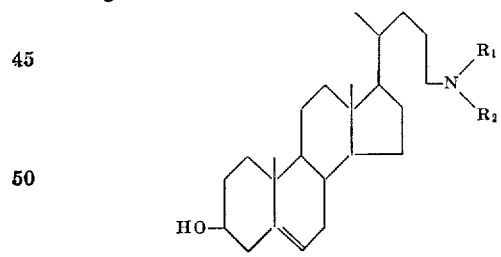

wherein R$_1$ and R$_2$ taken individually are selected from the class consisting of lower-alkenyl and lower-hydroxyalkyl, and R$_1$ and R$_2$ taken together with the attached nitrogen atom also represent a 4 to 6 ring atom heterocyclic amino radical, and the pharmacologically acceptable acid addition salts thereof.

3. A member of the class consisting of compounds having the formula:

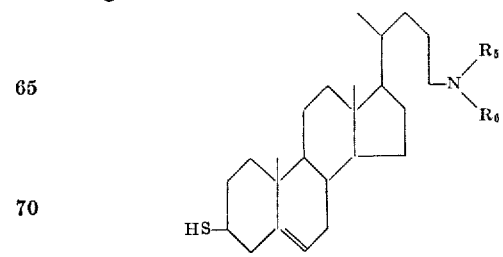

wherein R$_5$ and R$_6$ taken individually are selected from the class consisting of lower-alkyl, and lower alkenyl, and R$_5$ and R$_6$ taken together with the attached nitrogen atom also represent a 4 to 6 ring atom heterocyclic amino radical, and the pharmacologically acceptable acid addition salts thereof.

4. A member of the class consisting of compounds having the formula:

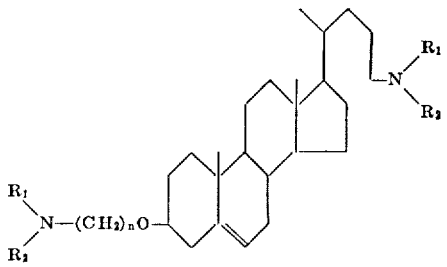

wherein $R_1$ and $R_2$ taken individually are selected from the class consisting of hydrogen, lower-alkyl, lower-alkenyl, and lower-hydroxyalkyl and $R_1$ and $R_2$ taken together with the attached nitrogen atom also represent a 4 to 6 ring atom heterocyclic amino radical, and $n$ is an integer from 2 to 6, and the pharmacologically acceptable acid addition salts thereof.

5. A member of the class consisting of compounds having the formula:

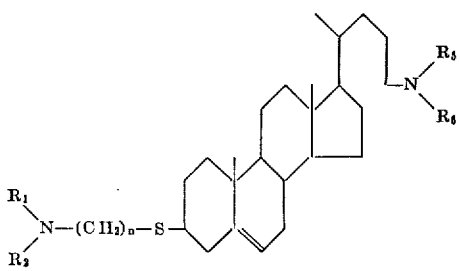

wherein $R_1$ and $R_2$ taken individually are selected from the class consisting of hydrogen, lower-alkyl, and lower-alkenyl, and lower-hydroxyalkyl, $R_1$ and $R_2$ taken together with the attached nitrogen atom also represent a 4 to 6 ring atom heterocyclic amino radical, $n$ is an integer from 2 to 6, $R_5$ and $R_6$ taken individually are selected from the class consisting of lower-alkyl and lower-alkenyl, and $R_5$ and $R_6$ taken together with the attached nitrogen atom also represent a 3 to 6 ring atom heterocyclic amino radical, and the pharmacologically acceptable acid addition salts thereof.

6. A member of the class consisting of compounds having the formula:

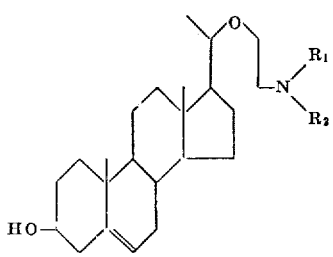

wherein $R_1$ and $R_2$ taken individually are selected from the class consisting of lower-alkyl and lower-alkenyl, and $R_1$ and $R_2$ taken together with the attached nitrogen atom represent a 4 to 6 ring atom heterocyclic amino radical, and the pharmacologically acceptable acid addition salts thereof.

7. A member of the class consisting of compounds having the formula:

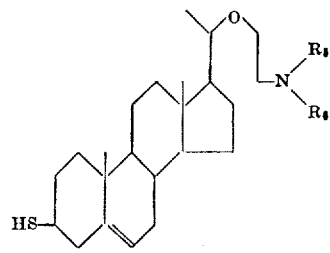

wherein $R_5$ and $R_6$ taken individually are selected from the class consisting of lower-alkyl and lower-alkenyl, and $R_5$ and $R_6$ taken together with the attached nitrogen atom also represent a 4 to 6 ring atom heterocyclic amino radical, and the pharmacologically acceptable acid addition salts thereof.

8. A member of the class consisting of compounds having the formula:

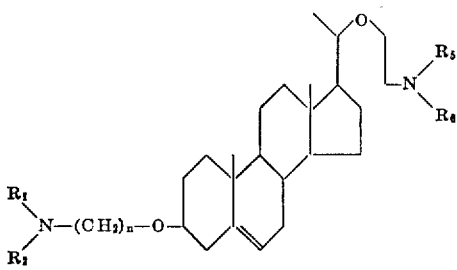

wherein $R_1$ and $R_2$ taken individually are selected from the class consisting of hydrogen, lower-alkyl, lower-alkenyl, and lower-hydroxyalkyl, $R_1$ and $R_2$ taken together with the attached nitrogen atom also represent a 4 to 6 ring atom heterocyclic amino radical, $n$ is an integer from 2 to 6, $R_5$ and $R_6$ taken individually are selected from the class consisting of lower-alkyl and lower-alkenyl, and $R_5$ and $R_6$ taken together with the attached nitrogen atom also represent a 3 to 6 ring atom heterocyclic amino radical, and the pharmacologically acceptable acid addition salts thereof.

9. A member of the class consisting of compounds having the formula:

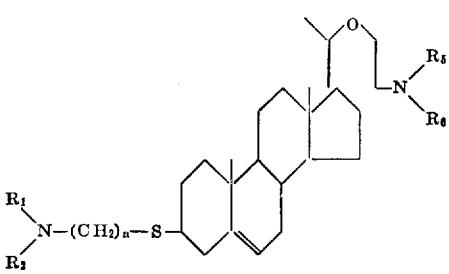

wherein $R_1$ and $R_2$ taken individually are selected from the class consisting of hydrogen, lower-alkyl, lower-alkenyl, and lower-hydroxyalkyl, $R_1$ and $R_2$ taken together with the attached nitrogen atom also represent a 4 to 6 ring atom heterocyclic amino radical, $n$ is an integer from 2 to 6, $R_5$ and $R_6$ taken individually are selected from the class consisting of lower-alkyl and lower-alkenyl, and $R_5$ and $R_6$ taken together with the attached nitrogen atom also represent a 3 to 6 ring atom heterocyclic amino radical, and the pharmacologically acceptable acid addition salts thereof.

10. A member of the class consisting of compounds having the formula:

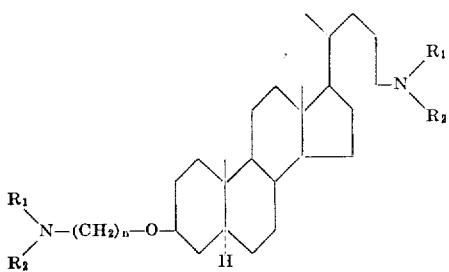

wherein $R_1$ and $R_2$ taken individually are selected from the class consisting of hydrogen, lower-alkyl, lower-alkenyl, and lower-hydroxyalkyl, and $R_1$ and $R_2$ taken together with the attached nitrogen atom also represent a 4 to 6 ring atom heterocyclic amino radical, and $n$ is an integer from 2 to 6, and the pharmacologically acceptable acid addition salts thereof.

11. A member of the class consisting of the compounds having the formula:

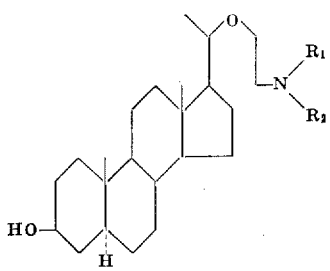

wherein $R_1$ and $R_2$ taken individually are selected from the class consisting of lower-alkyl and lower-alkenyl and $R_1$ and $R_2$ taken together with the attached nitrogen atom also represent a 4 to 6 ring atom heterocyclic amino radical, and the pharmacologically acceptable acid addition salts thereof.

12. A member of the class consisting of compounds having the formula:

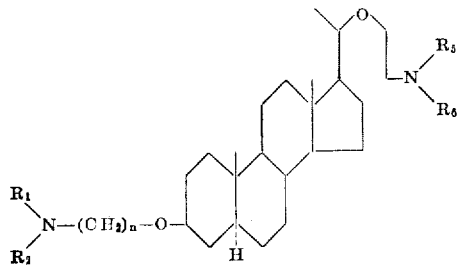

wherein $R_1$ and $R_2$ taken individually are selected from the class consisting of hydrogen, lower-alkyl, lower-alkenyl, and lower-hydroxyalkyl, $R_1$ and $R_2$ taken together with the attached nitrogen atom also represent a 4 to 6 ring atom heterocyclic amino radical, $n$ is an integer from 2 to 6, $R_5$ and $R_6$ taken individually are selected from the class consisting of lower-alkyl and lower-alkenyl, and $R_5$ and $R_6$ taken together with the attached nitrogen atom also represent a 3 to 6 ring atom heterocyclic amino radical, and the pharmacologically acceptable acid addition salts thereof.

13. A member of the class consisting of (a) compounds having the formula:

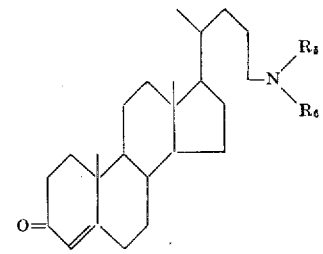

wherein $R_5$ and $R_6$ taken individually are selected from the class consisting of lower-alkyl and lower-alkenyl and $R_5$ and $R_6$ taken together with the attached nitrogen atom also represent a 4 to 6 ring atom heterocyclic amino radical, (b) the oximes of the compounds of the above formula, and (c) the pharmacologically acceptable acid addition salts of the compounds of the above formula and of the oximes thereof.

14. A member of the class consisting of (a) compounds having the formula:

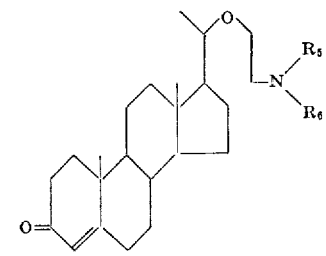

wherein $R_5$ and $R_6$ taken individually are selected from the class consisting of lower-alkyl and lower-alkenyl and $R_5$ and $R_6$ taken together with the attached nitrogen atom also represent a 4 to 6 ring atom heterocyclic amino radical, (b) the oximes of the compounds of the above formula, and (c) the pharmacologically acceptable acid addition salts of the compounds of the above formula and of the oximes thereof.

15. A member of the class consisting of compounds having the formula:

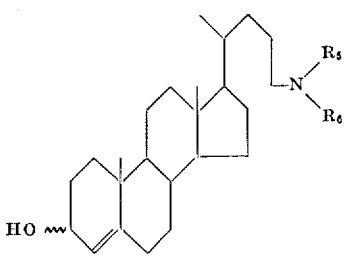

wherein $R_5$ and $R_6$ taken individually are selected from the class consisting of lower-alkyl and lower-alkenyl and $R_5$ and $R_6$ taken together with the attached nitrogen atom also represent a 4 to 6 ring atom heterocyclic amino radical, and the pharmacologically acceptable acid addition salts thereof.

16. A member of the class consisting of compounds having the formula:

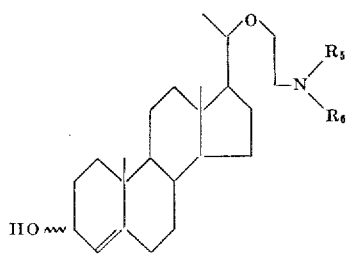

wherein $R_5$ and $R_6$ taken individually are selected from the class consisting of lower-alkyl and lower-alkenyl and $R_5$ and $R_6$ taken together with the attached nitrogen atom also represent a 4 to 6 ring atom heterocyclic amino radical, and the pharmacologically acceptable acid addition salts thereof.

17. The process which comprises reacting a 6β-alkoxy-3,5-cyclocholan-24-ol 24-sulfonacylate with an excess of an amine $R_1R_2NH$ wherein $R_1$ and $R_2$ taken individually are selected from the class consisting of lower-alkenyl and lower-hydroxyalkyl, and $R_1$ can also represent hydrogen, and $R_1$ and $R_2$ taken together with the attached nitrogen atom also represent a 4 to 6 ring atom heterocyclic amino radical, to obtain the corresponding N-substituted 24-amino-6β-alkoxy-3,5-cyclocholane, and treating the latter compound with a reagent selected from the class consisting of formic acid, mineral acid, and zinc acetate in glacial acetic acid, followed by treatment with a strong base to obtain a compound having the formula:

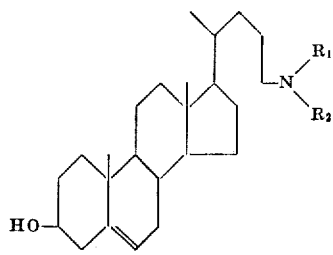

wherein $R_1$ and $R_2$ have the significance above defined.

18. The process which comprises reacting a 6β-alkoxy-3,5-cyclocholan-24-ol with a diol $HO(CH_2)_nOH$ wherein $n$ is an integer from 2 to 6, in the presence of p-toluenesulfonic acid and an inert solvent to obtain a compound having the formula:

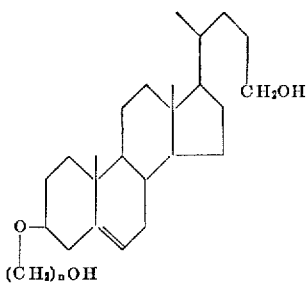

reacting the latter compound with a sulfonacylating agent in the presence of a tertiary base to obtain the corresponding bis-sulfonacylate and reacting the latter compound with an excess of an amine $R_1R_2NH$ wherein $R_1$ and $R_2$ taken individually are selected from the class consisting of hydrogen, lower-alkyl, lower-alkenyl, and lower-hydroxy-alkyl, and $R_1$ and $R_2$ taken together with the attached nitrogen atom represent the residue of a 4 to 6 ring atom heterocyclic amino radical, to obtain a compound having the formula:

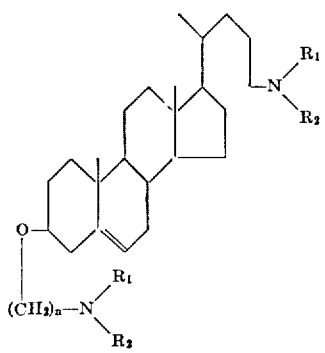

wherein $R_1$ and $R_2$ have the significance above defined.

19. The process which comprises reacting a 6β-alkoxy-3,5-cyclocholane having the formula:

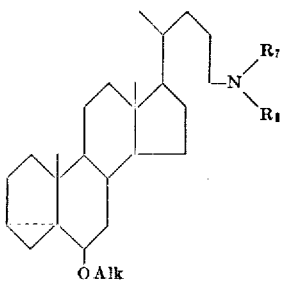

wherein Alk represents lower-alkyl and $R_7$ and $R_8$ taken individually are selected from the class consisting of lower-alkyl, lower-alkenyl and the acyl radical of a carboxylic acid containing 1 to 12 carbon atoms, inclusive, and $R_7$ and $R_8$ taken together with the attached nitrogen atom also represent a 4 to 6 ring atom heterocyclic amino radical, with a diol $HO(CH_2)_nOH$ wherein $n$ is an integer from 2 to 6 in the presence of p-toluenesulfonic acid and an inert solvent to produce a compound having the formula:

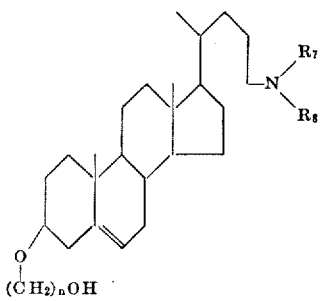

wherein $R_7$ and $R_8$ and $n$ have the significance above defined, reacting the latter compound with a sulfonacylating agent in the presence of a tertiary amine to obtain the corresponding sulfonacylate and reacting the latter compound with an excess of an amine $R_1R_2NH$ wherein $R_1$ and $R_2$ taken individually are selected from the class consisting of hydrogen, lower-alkyl, lower-alkenyl, and lower-hydroxyalkyl and $R_1$ and $R_2$ taken together with the attached nitrogen atom also represent a 4 to 6 ring atom heterocyclic amino radical to obtain a compound having the formula:

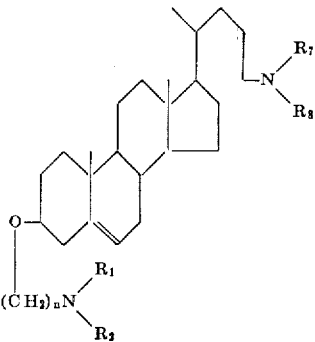

wherein $R_1$, $R_2$, $R_7$, $R_8$ and $n$ have the significance above defined, and, where one or both of $R_7$ and $R_8$ represent acyl, subjecting the compound so obtained to hydrolysis to remove the N-acyl group.

20. The process which comprises reacting a 6β-alkoxy-3,5-cyclopregnane-20-ol with an aminoalkyl halide $$R_1R_2N-(CH_2)_2-Hal$$

wherein $R_1$ and $R_2$ taken individually are selected from the class consisting of lower-alkyl and lower-alkenyl, and $R_1$ and $R_2$ taken together with the attached nitrogen atom also represent at 4 to 6 ring atom heterocyclic amino radical, and Hal represents halogen, in the presence of an alkyl lithium and an inert organic solvent to obtain a compound having the formula:

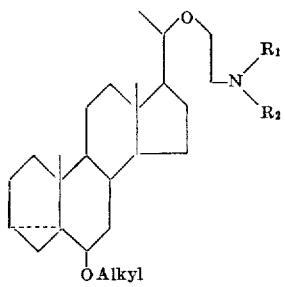

wherein $R_1$ and $R_2$ have the significance above defined and reacting the latter compound with a reagent selected from the class consisting of formic acid, mineral acid, and zinc acetate in glacial acetic acid followed by treatment with a strong base to yield a compound having the formula:

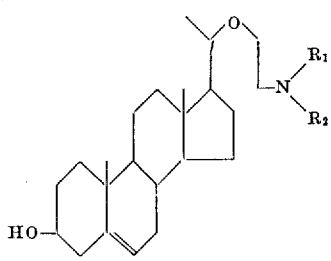

wherein $R_1$ and $R_2$ are as above defined.

21. The process which comprises reacting a 6β-alkoxy-3,5-cyclocholane having the formula:

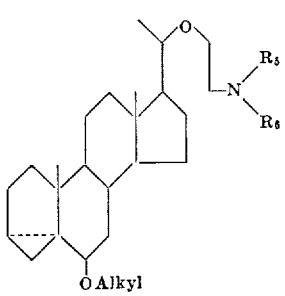

wherein $R_5$ and $R_6$ taken individually are selected from the class consisting of lower-alkyl and lower-alkenyl, and $R_5$ and $R_6$ taken together with the attached nitrogen atom also represent a 4 to 6 ring atom heterocyclic amino radical, with a diol $HO(CH_2)_nOH$ wherein $n$ is an integer from 2 to 6, in the presence of p-toluenesulfonic acid and an inert solvent to produce a compound having the formula:

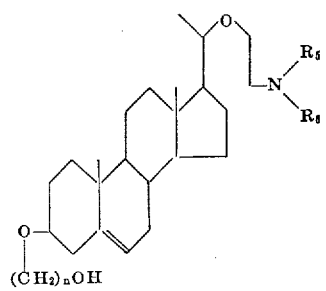

wherein $R_5$, $R_6$ and $n$ have the significance above defined, reacting the latter compound with a sulfonacylating agent in the presence of a tertiary amine to obtain the corresponding sulfonacylate and reacting the latter compound with an excess of an amine $R_1R_2NH$ wherein $R_1$ and $R_2$ taken individually are selected from the class consisting of hydrogen, lower-alkyl, lower-alkenyl, and lower-hydroxyalkyl and $R_1$ and $R_2$ taken together with the attached nitrogen atom also represent at 4 to 6 ring atom heterocyclic amino radical to obtain a compound having the formula:

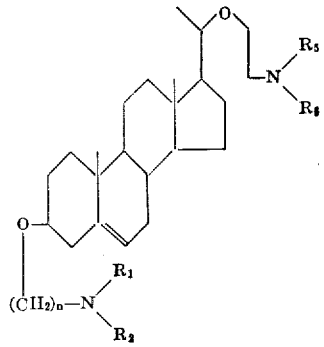

wherein $R_1$, $R_2$, $R_5$, $R_6$ and $n$ have the significance above defined.

22. The process which comprises reacting a compound having the formula:

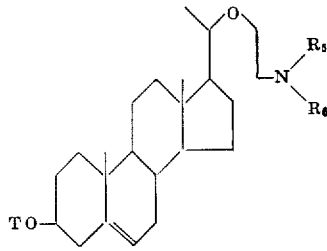

wherein T is the acyl radical of an acid selected from the class consisting of arylsulfonic acids and alkylsulfonic acids, $R_5$ and $R_6$ taken individually are selected from the class consisting of lower-alkyl and lower-alkenyl, and $R_5$ and $R_6$ taken together with the attached nitrogen atom also represent a 4 to 6 ring atom heterocyclic amino radical, with thiourea in the presence of a tertiary base and subjecting the product so formed to alkaline hydrolysis to obtain the corresponding 3-thiol having the formula:

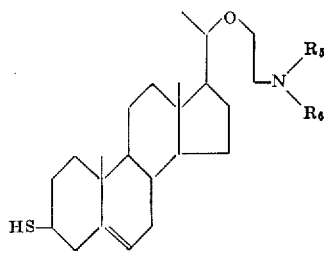

wherein $R_5$ and $R_6$ are as above defined.

References Cited by the Examiner

UNITED STATES PATENTS

| | | | |
|---|---|---|---|
| 2,561,378 | 7/1951 | Julian et al. | 260—397.5 |
| 3,038,912 | 6/1962 | Nystead | 260—397.1 |
| 3,144,471 | 8/1964 | Nelson | 260—397.5 |

OTHER REFERENCES

Bernstein et al., J. Amer. Chem. Soc., 76, pp. 5674–5678 (1954) (pp. 5677 and 5678 relied on).

Frank et al., J. Amer. Chem. Soc., 68, pp. 2103 and 2104 (1946).

Jones et al., J. Org. Chem. 21, pp. 586 and 587 (1956).

Katz et al., J. Org. Chem., 19, pp. 767–772 (1954).

Kupfer, Tetrahedron, 15, pp. 193–196.

Wessely et al., Monatshefte f. Chem., 82, pp. 437–442 (1951) (pp. 437 and 441 relied on).

Willstatter et al., Ber Deut. Chem., 41, pp. 2199–2203 (1908).

LEWIS GOTTS, *Primary Examiner.*

T. MESHBESHER, *Assistant Examiner.*